United States Patent
Watanabe et al.

(10) Patent No.: US 6,456,386 B1
(45) Date of Patent: Sep. 24, 2002

(54) IMAGE FORMING SYSTEM INCLUDING SORTER UNIT

(75) Inventors: Masao Watanabe, Kawasaki; Shizuo Hasegawa, Urayasu; Masatoshi Yaginuma, Tokyo; Katsunari Suzuki; Hirokazu Kodama, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/273,976

(22) Filed: Mar. 22, 1999

Related U.S. Application Data

(62) Division of application No. 08/916,371, filed on Aug. 22, 1997.

(30) Foreign Application Priority Data

| Jan. 24, 1995 | (JP) | 7-027476 |
| Jan. 24, 1995 | (JP) | 7-027477 |
| Jan. 24, 1995 | (JP) | 7-027478 |
| Jan. 24, 1995 | (JP) | 7-027480 |
| Feb. 27, 1995 | (JP) | 7-063411 |

(51) Int. Cl.$^7$ .......................... B41B 15/00; B41J 15/00; H04N 1/00; H04N 1/04; B65H 39/10
(52) U.S. Cl. .................. 358/1.12; 358/1.11; 358/1.13; 358/400; 358/498; 271/290; 271/296; 271/298
(58) Field of Search .............................. 358/1.11, 1.15, 358/1.1, 1.12, 1.13, 1.14, 1.18, 436–438, 439, 498, 400; 271/296, 290, 298, 58.08, 58.18, 176, 287, 294, 3.13; 101/2

(56) References Cited

U.S. PATENT DOCUMENTS 5,551,686 A * 9/1996 Sanchez et al. ............. 271/298
5,752,697 A * 5/1998 Mandel et al. ............. 271/288
5,784,179 A * 7/1998 Yoshida ..................... 358/498

FOREIGN PATENT DOCUMENTS

| EP | 0 585 075 | 3/1994 |
| JP | 59-053359 | 3/1984 |
| JP | 63-060870 | 3/1988 |
| JP | 02-221061 | 9/1990 |

OTHER PUBLICATIONS

Patent Abstracts of Japan, vol. 12, No. 282 (M–726) (JP 63–060870, Mar. 16, 1988), Aug. 3, 1988.
Patent Abstracts of Japan, vol. 08, No. 158 (M–311) (JP 59–053359, Mar. 28, 1984), Jul. 21, 1984.
Patent Abstracts of Japan, vol. 14, No. 527 (M–1050) (JP 02–221061, Sep. 4, 1990), Nov. 20, 1990.

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

An object of the present invention is to improve an efficiency in using bins in a sorter of an image forming system, to which a plurality of personal computers are connected. If the number of the receptacles appointed in accordance with the receptacle appointment command or the number of sets of sheets to be sorted is larger than the number of empty receptacles, offset sorting is performed in which the position, at which the recording sheets are received, is shifted in the same receptacle. If the appointed number of the receptacles or the number of sets of sheets to be sorted is smaller than the number of empty receptacles, a normal sorting process is performed in such a manner that the bins are allotted in accordance with the position of the bins appointed with the command for appointing receptacles or the number of sets of sheets to be sorted.

24 Claims, 25 Drawing Sheets

FIG. 4
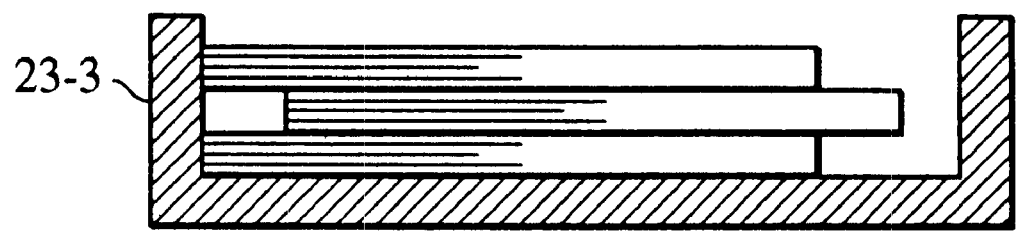
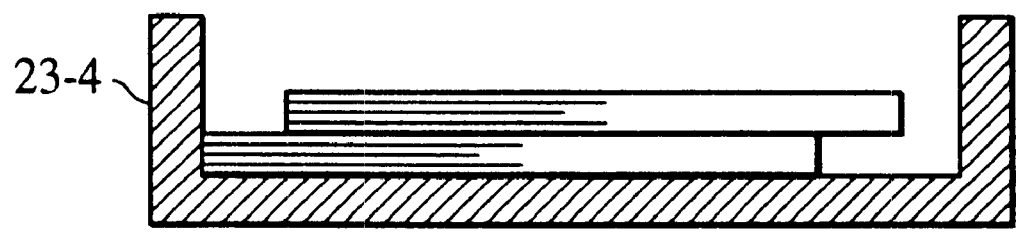

IMAGE FORMING SYSTEM INCLUDING SORTER UNIT

This application is a division of Ser. No. 08/916,371 filed Aug. 22, 1997.

BACKGROUND OF THE INVENTION

1. Field of the Invention

The present invention relates to an image forming system including a sorter unit and permitting a plurality of personal computers to be connected.

2. Related Background Art

An information processing apparatus of a type connected to external units, such as computers and/or facsimile apparatuses on a network, and having a mail box sorter for sorting and receiving recording sheets outputted from the connected apparatus has been considered to enable the receptacles (bins) for receiving the recording sheets to be appointed from the external apparatus by using driver software.

However, an information processing apparatus of the foregoing type cannot appoint bins from an external apparatus only when all of appointed bins have no sheets. Therefore, sorting has been inhibited though empty bins exist which are not used by a user. If the number of empty bins is smaller than that of sets of sheets to be sorted, sorting has been inhibited. The foregoing structure prevents improvement in the efficiency of using the bins in the mail box sorter.

Moreover, the external apparatus is not always provided with the driver software and therefore the recording sheets are discharged to a predetermined receptacle if the external unit has no driver software. That is, an information processing apparatus of the foregoing type has been provided with a special receptacle called a "non-sort bin" into which recording sheets are discharged if no recording sheet receptacle is appointed.

However, in a viewpoint of performing sorting of recording sheets and receiving of the same at an extremely satisfactory efficiency, the space for the fixedly provided non-sort bin prevents the improvement in the efficiency.

When an external apparatus appoints bins, it simply appoints the bin, at which the receipt is started, and the number of sets of sheets to be sorted. Therefore, if one sheet is left in a bin, the bin, at which the receipt is started, cannot be appointed and the receipt is inhibited. The foregoing fact deteriorates the efficiency in using the bins in the mail box sorter.

Since any receptacle has no display means although a plurality of network users share the mail box sorter, the user who has caused the recording sheets to be discharged to the receptacle cannot be detected frequently.

In the case where a plurality of receptacles for receiving the recording sheets are appointed from an input apparatus by using printer driver software, a stop bin (a bin at which sorting is ended) cannot be appointed though a start bin (a bin at which sorting is started) can be appointed arbitrarily. That is, the range of the receptacles to be used cannot be appointed. Therefore, the number of bins is unintentionally increased and thus the range of the receptacles, which can be used by another input apparatus, is limited undesirably.

SUMMARY OF THE INVENTION

An object of the present invention is to provide an image forming system capable of overcoming the foregoing problems.

Another object of the present invention is to provide an image forming system capable of improving an efficiency in using bins in a sorter thereof.

Another object of the present invention is to provide an image forming system capable of easily detecting a unit, which has issued appointment of recording sheets received in the bins in the sorter.

Other objects, features and advantages of the invention will be evident from the following detailed description of the preferred embodiments described in conjunction with the attached drawings.

BRIEF DESCRIPTION OF THE DRAWINGS

FIG. 4 is a diagram showing offset sorting;

DESCRIPTION OF THE PREFERRED EMBODIMENT

Figure 1:
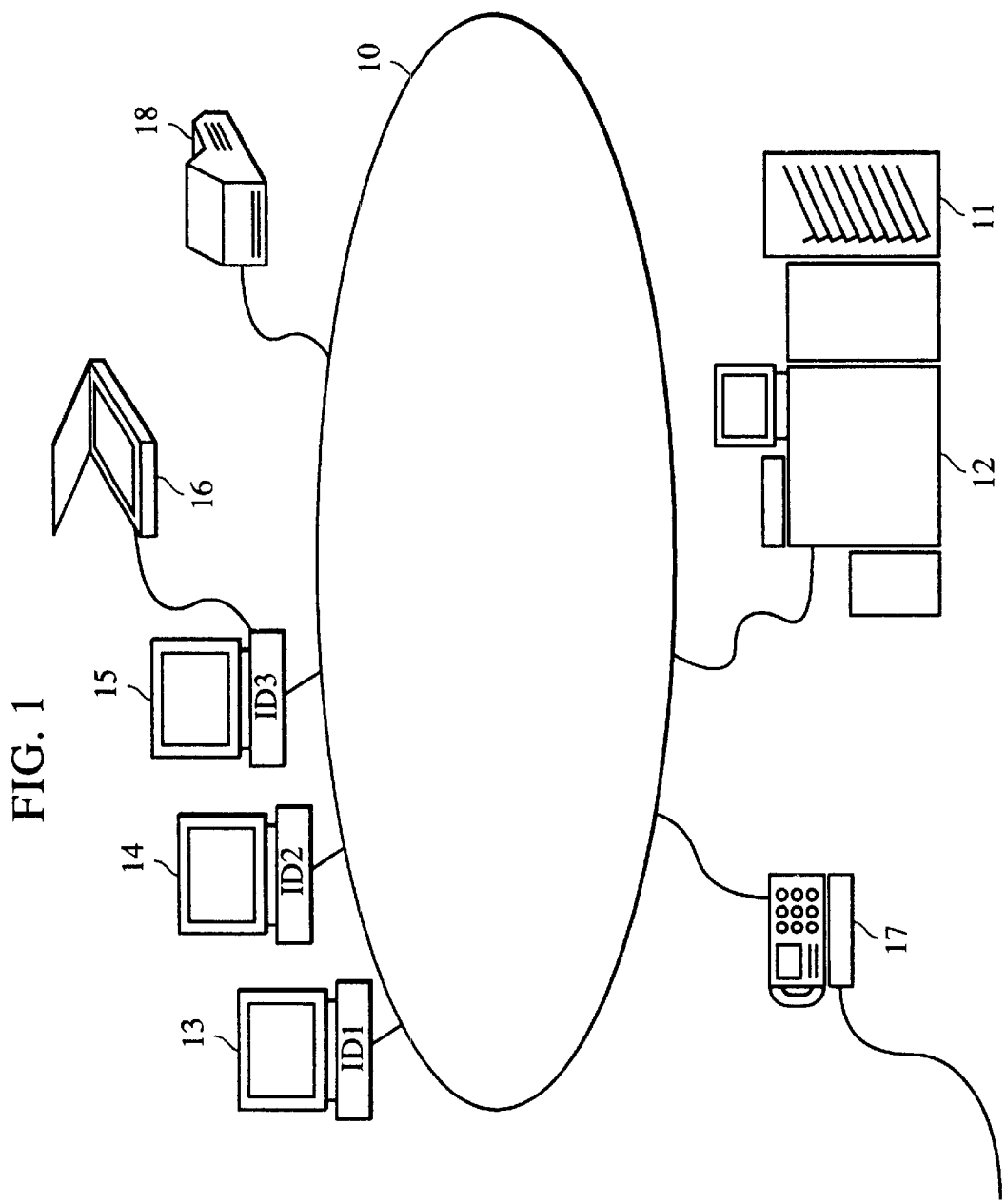
FIG. 1 is a block diagram showing a schematic structure of an information processing apparatus according to an embodiment of the present invention.

Referring to the drawings, embodiments of the present invention will now be described.

FIG. 1 is a block diagram showing the schematic structure of an information processing system including an information processing apparatus according to first embodiment of the present invention.

Referring to FIG. 1, reference numeral 10 represents a network, such as a LAN. A copying machine 12, to which a mail box sorter 11 is connected, terminal computers 13 and 14, a terminal computer 15, to which a scanner 16 is connected, a facsimile apparatus 17 and a printer 18 are connected to the network 10.

On the foregoing network 10, an image can be outputted from the copying machine 12, the terminal computers 13, 14 and 15, the facsimile apparatus 17 or the printer 18. Line communication with an external network is performed by the facsimile apparatus 17. The copying machine 12 is arranged to independently read or output an image. Each of the terminal computer 15, capable of fetching an image from the scanner 16, and the terminal computer 13 has driver software capable of driving all units on the network of the system according to this embodiment. Each of the terminal computers 13 and 15 is able to transmit an image through a line connected to the facsimile apparatus 17.

Moreover, a document processed by the terminal computer 13 or the terminal computer 15 can be printed by the printer of the copying machine 12 and received by a predetermined receptacle (to be described later) of the mail box sorter 11. An image read by the copying machine 12 can be edited by the terminal computer 15 and outputted from the printer 18.

Figure 2:
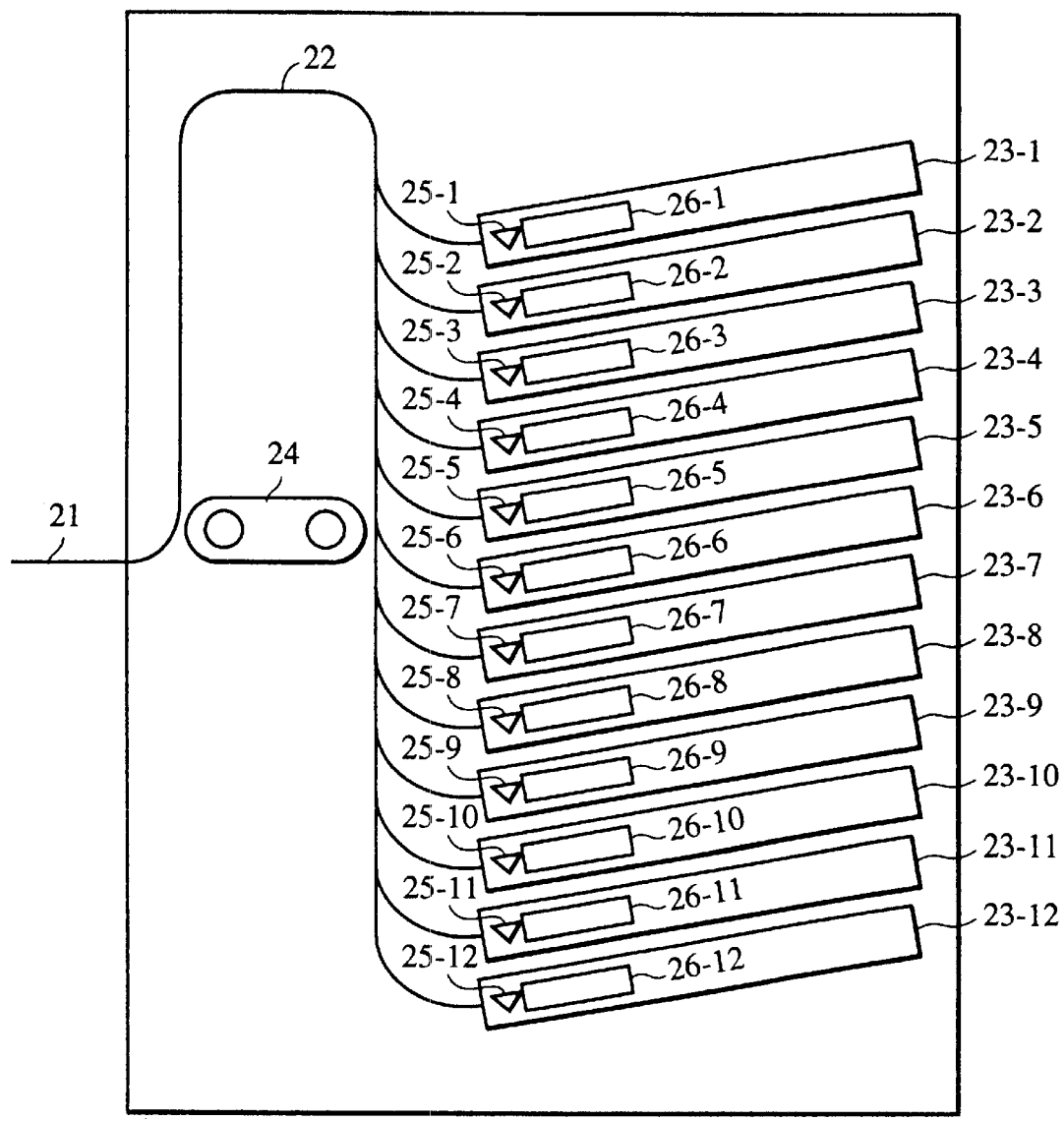
FIG. 2 is a schematic view showing the mail box sorter 11 shown in FIG. 1.

FIG. 2 is a schematic diagram of the mail box sorter 11 shown in FIG. 1.

Referring to FIG. 2, reference numeral 21 represents an inlet port through which recording sheets outputted from the copying machine 12 are introduced. A single-sheet conveyance passage 22 is connected to the recording-sheet inlet port 21. A plurality of receptacles (bins) 23-1 to 23-12 for receiving the recording sheets are disposed downstream from the single-sheet conveyance passage 22. Between the recording-sheet inlet port 21 and the bins 23-1 to 23-12, there is disposed a sheet-bundle conveyance unit 24 for conveying a recording sheet bundle.

Single sheets are branched by a flapper (not shown) through the single-sheet conveyance passage 22 and received in each of appointed receptacles. In a case where a recording sheet bundle is conveyed to a position upstream from the mail box sorter 11 due to finishing, the sheet bundle is received by the sheet-bundle conveyance unit 24. Then, the sheet-bundle conveyance unit 24 is vertically moved so that the recording-sheet bundle is received by appointed receptacles.

The bins 23-1 to 23-12 have corresponding sheet sensors 25-1 to 25-12, each of which detects existence of a sheet therein, and display portions 26-1 to 26-12 for displaying the receptacle numbers and non-appointed bins (non-sort bins). Each of the sheet sensors 25-1 to 25-12 outputs High ("1") if a sheet exists in the receptacle and outputs Low ("0") if no sheet exists. Each of the display portions 26-1 to 26-12 displays numerals, characters, and/or marks and formed by liquid crystal or a light emitting diode.

Figure 3:
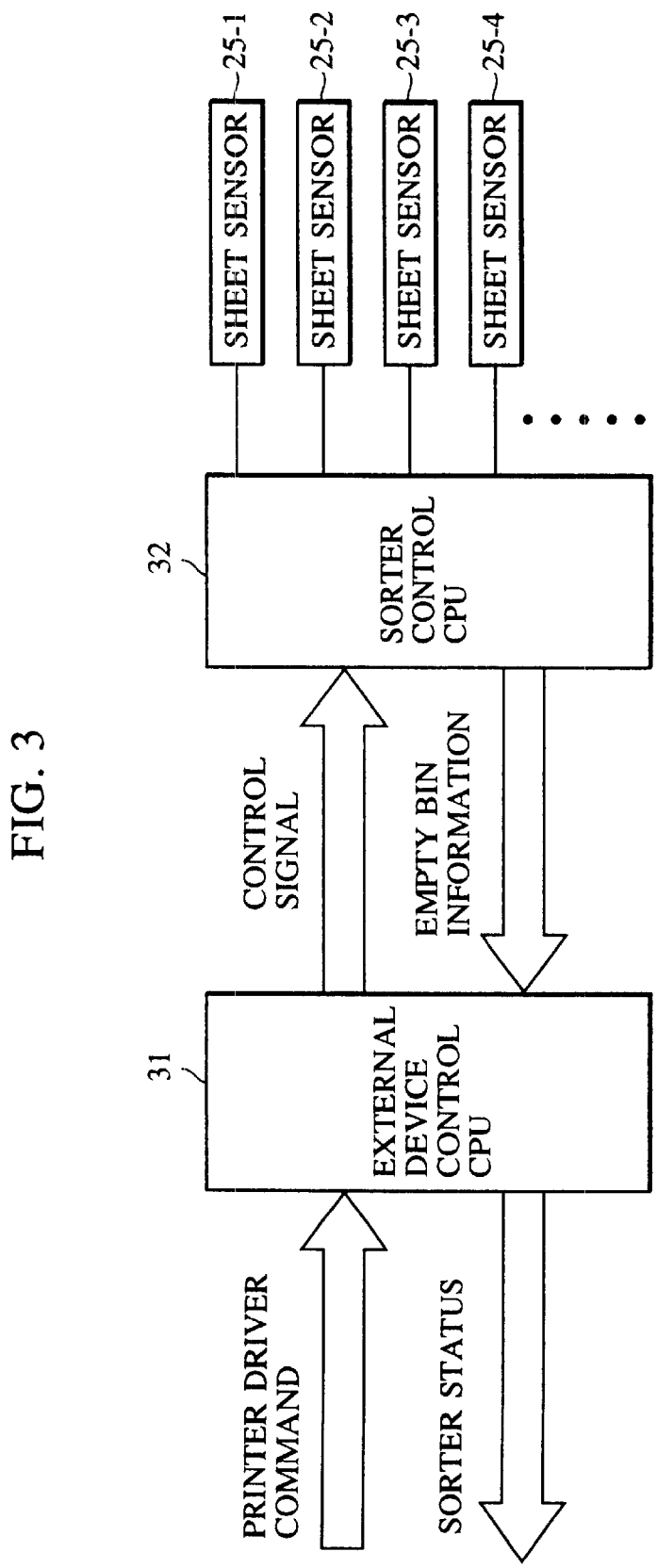
FIG. 3 is a schematic view showing the relationship between a CPU of the copying machine 12 and a CPU of the mail box sorter 11 shown in FIG. 1.

FIG. 3 is a schematic view showing the relationship between a CPU in the copying machine 12 and a CPU in the mail box sorter 11 shown in FIG. 1.

Referring to FIG. 3, reference numeral 31 represents an external-unit controlling CPU disposed in the body of the copying machine 12. Reference numeral 32 represents a sorter controlling CPU disposed in the mail box sorter 11.

The external-unit controlling CPU 31 is a CPU for controlling external units, that is, the terminal computers 13, 14 and 15, the facsimile apparatus 17 and the printer 18. The external-unit controlling CPU 31 transmits a control signal from the body of the copying machine to the sorter controlling CPU 32. The external-unit controlling CPU 31 controls a printing standby state, a state of use of the network 10, a state of bins which are being used, the count of recording sheets, a state of recording sheets (whether a single sheet or a bundle of sheets) and the count of the sheet sets. Moreover, the external-unit controlling CPU 31 receives a command for appointing receptacles for receiving the recording sheets issued by an external unit connected to the network 10.

The sorter controlling CPU 32 is a CPU for controlling the communication between the body of the copying machine 12 and the mail box sorter 11. The sorter controlling CPU 32 detects a state where a sheet exists in each of receptacles 23-1 to 23-12 and counts the total number of the recording sheets received by the receptacles 23-1 to 23-12. Moreover, the sorter controlling CPU 32 responds to the command for appointing receptacles issued by the external-unit controlling CPU 31 so as to perform control for maximizing the productivity in the sorting operation.

The sorter controlling CPU 32 comprises a usable receptacle determining means for selecting usable receptacles from the plurality of receptacles in accordance with information indicating whether sheets exist and supplied from a sheet sensor 26; and an information transmission means for notifying the usable receptacles determined by the usable receptacle determining means.

The operation (an information processing method) of this embodiment will now be described.

A receiving operation will now be described.

A state where no sheet exists in the mail box sorter 11 is determined to be an initial state. In this embodiment, an image processed by the terminal computer 13 is transmitted to the copying machine 12 in the initial state, and the recording sheets are sorted into 6 bins from a fifth bin (the receptacle 23-5) to a tenth bin (the receptacle 23-10).

When an image is, in the foregoing state, transmitted from the facsimile apparatus 17, which has not the function of issuing the command for appointing receptacles, and thus the recording sheets are, through the copying machine 12, outputted so as to be received by the mail box sorter 11, the recording sheets are received by the first bin (the receptacle 23-1) to the fourth bin (the receptacle 23-4) or the eleventh bin (the receptacle 23-11) to the twelfth bin (the receptacle 23-12) (a non-sort bin setting process).

When an image processed by the terminal computer 15 is outputted to the copying machine 12 and five sets of recording sheets are sorted so as to be received by the mail box sorter 11 in a case where only the third bin (the receptacle 23-3) and the fourth bin (the receptacle 23-4) are empty, three sets are received by the third bin and two sets are received by the fourth bin as shown in FIG. 4 in such a manner that the bins for receiving the sets are shifted whenever it receives one set (the foregoing operation is a characteristic of the present invention and called "offset sorting" (receptacle controlled sorting). The number of sets to be offset-sorted and the number of bins to be used are determined by the sorter controlling CPU 32 in accordance with a predetermined criterion (see FIG. 7).

To perform the foregoing receiving operation, the following software process is performed in this embodiment.

Figure 5:
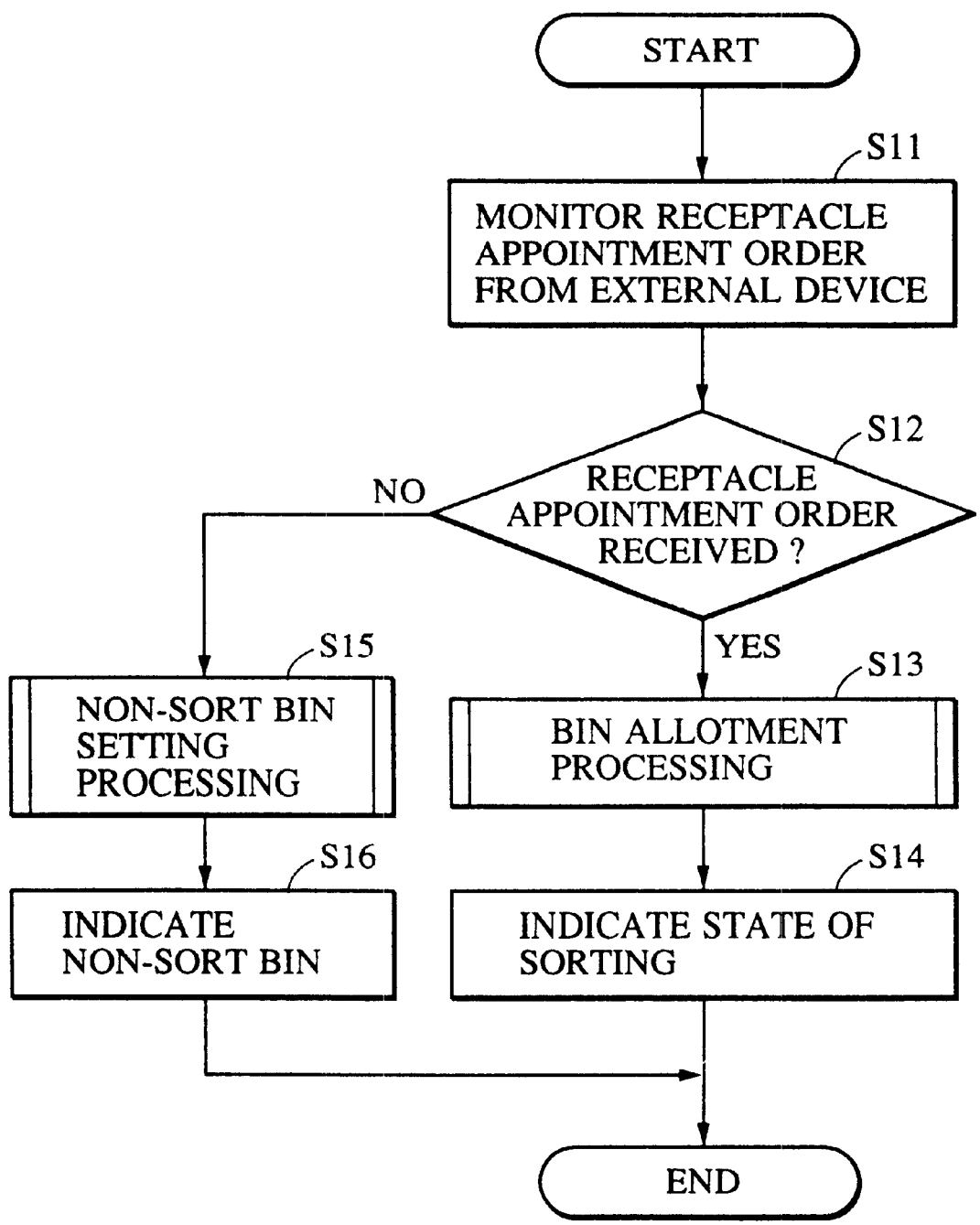
FIG. 5 is a flow chart of the overall process for receiving recording sheets.

FIG. 5 is a flow chart of the overall recording sheet receiving process according to this embodiment.

When power is supplied to the copying machine 12 and the mail box sorter 11, the sorter controlling CPU 32 monitors issue of the command for appointing receptacles from the external unit on the network 10 (step S11).

In step S12 whether the command for appointing receptacles has been received when an image has been supplied from the external unit is determined. If the command for appointing receptacles has been received, the operation proceeds to step S13.

Figure 6:
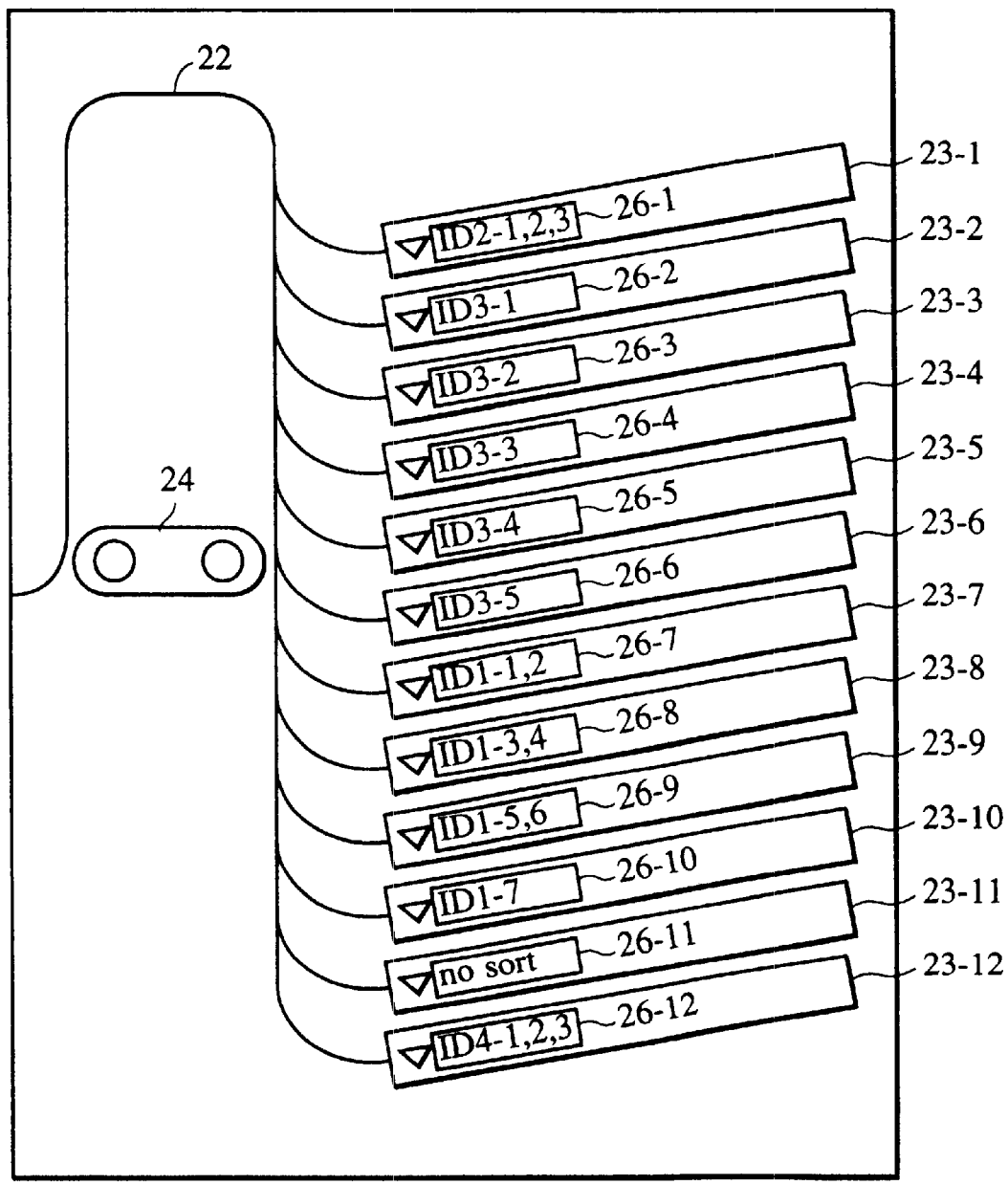
FIG. 6 is a diagram showing an example of display of a state of allotment.

In step S13 a bin allotment process, to be described later, is performed. As a result of the bin allotment process, the display portions 26-1 to 26-12 respectively display states of allotment performed by the sorter controlling CPU 32 (step S14), for example, as shown in FIG. 6. Then, the foregoing routine is ended.

If the external unit has no function of issuing the command for appointing receptacles or the same has not issued the command for appointing receptacles, that is, if no command for appointing receptacles has been issued from the external unit and therefore the command for appointing receptacles has not been received when an image has been supplied from the external unit (step S12), a non-sort bin setting process, to be described later, is performed (step S14), and the determined non-sort bin is displayed as the non-sort bin (step S15). Then, this routine is ended. The non-sort bin according to this embodiment is determined, for example, as shown in FIG. 6, to be the eleventh bin and display "no sort" is performed.

Figure 7:
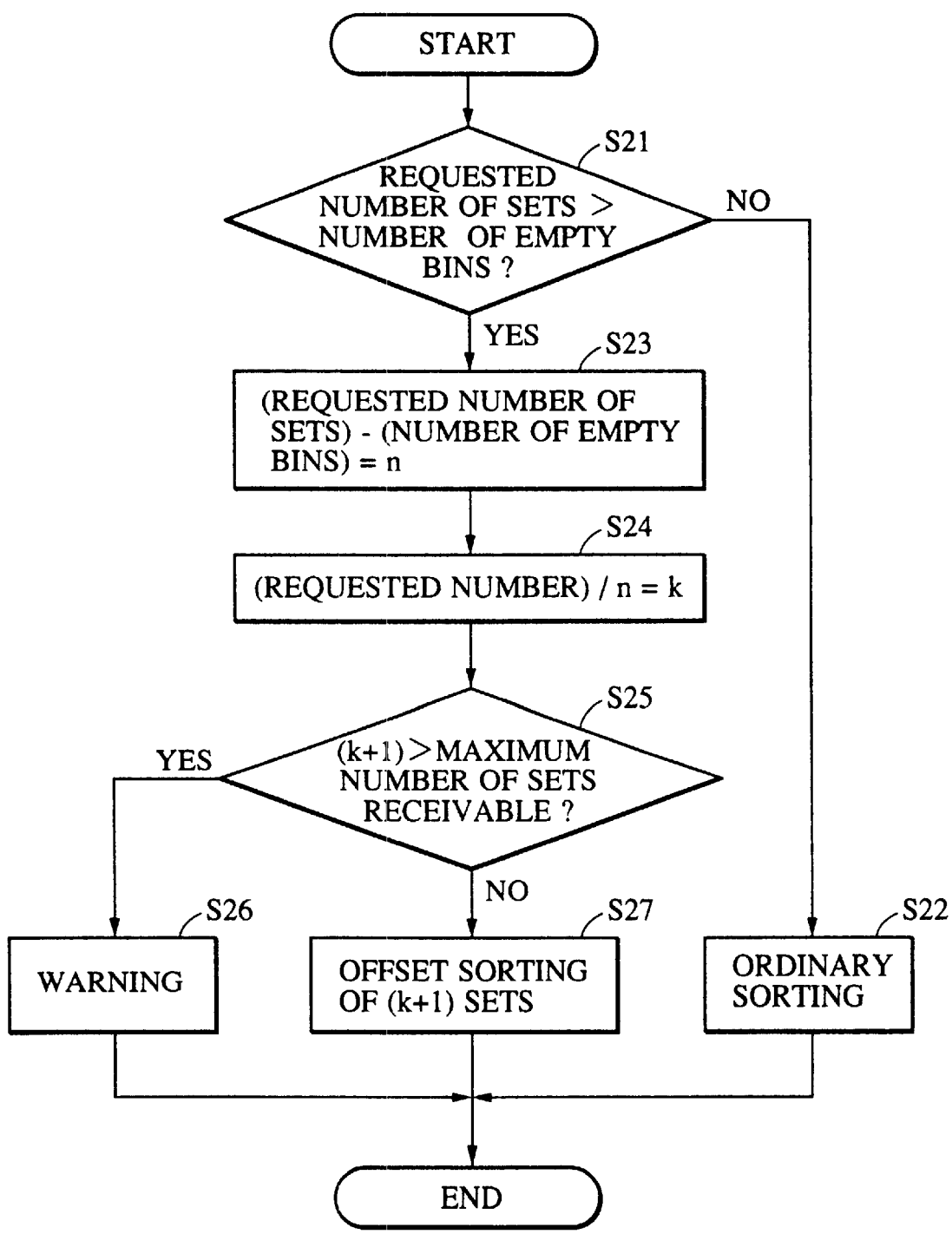
FIG. 7 is a flow chart of a bin allotment process shown in FIG. 5.

FIG. 7 is a flow chart of the bin allotment process (step S13) shown in FIG. 5.

In step S21 whether the number of bins or the number of sets of sheets to be sorted, each of which has been appointed in accordance with the received command for appointing receptacles is larger than the number of empty bins which are not used. The number of the empty bins has been previously recognized by the sorter controlling CPU 32 in accordance with information supplied from the sheet sensors 25-1 to 25-12. If the number of the appointed bins or that of sets of sheets to be sorted is smaller than the number of the empty bins, the operation proceeds to step S22 so that a normal sorting process is performed in such a manner that allotment of bins is performed in accordance with the positions of the bins or the number of the sets of sheets to be sorted or appointed in accordance with the command for appointing receptacles. Note that the usable bins for receiving the recording sheets have been determined by the sorter controlling CPU 32 and notified to the external unit.

If the number of the appointed bins or the number of the sets of sheets to be sorted is larger than the number of the empty bins, each set of sheets to be sorted cannot be received by each bin in a physical viewpoint (normally one set is received by one bin). To perform the foregoing offset sorting operation, the operation proceeds to step S23. In step S23 number n obtained by subtracting the number of empty bins from the number of the appointed sets of sheets to be sorted is stored; the appointed number of sets is divided by n stored in step S23; and the obtained value is stored as k.

Each bin receives the number of the sets obtained by adding 1 to k. If the number of sheets in (k+1) sets is larger than the number of sheets which can be received by one bin, the recording sheets cannot be received in a physical viewpoint. Accordingly, in step S25 the number of sheets in (k+1) sets and the maximum number of sheets which can be received by one bin are subjected to a comparison. If the number of sheets in (k+1) sets is larger than the maximum number of sheets which can be received by one bin, the operation proceeds to step S26 so that sorting being impossible is alarmed and notified to the external unit on the network 10 and sorting being impossible is displayed. If the number of sheets in (k+1) sets is, in step S25, smaller than the maximum number of sheets which can be received by one bin, the operation proceeds to step S27 so that the foregoing offset sorting process is performed.

Figure 8:
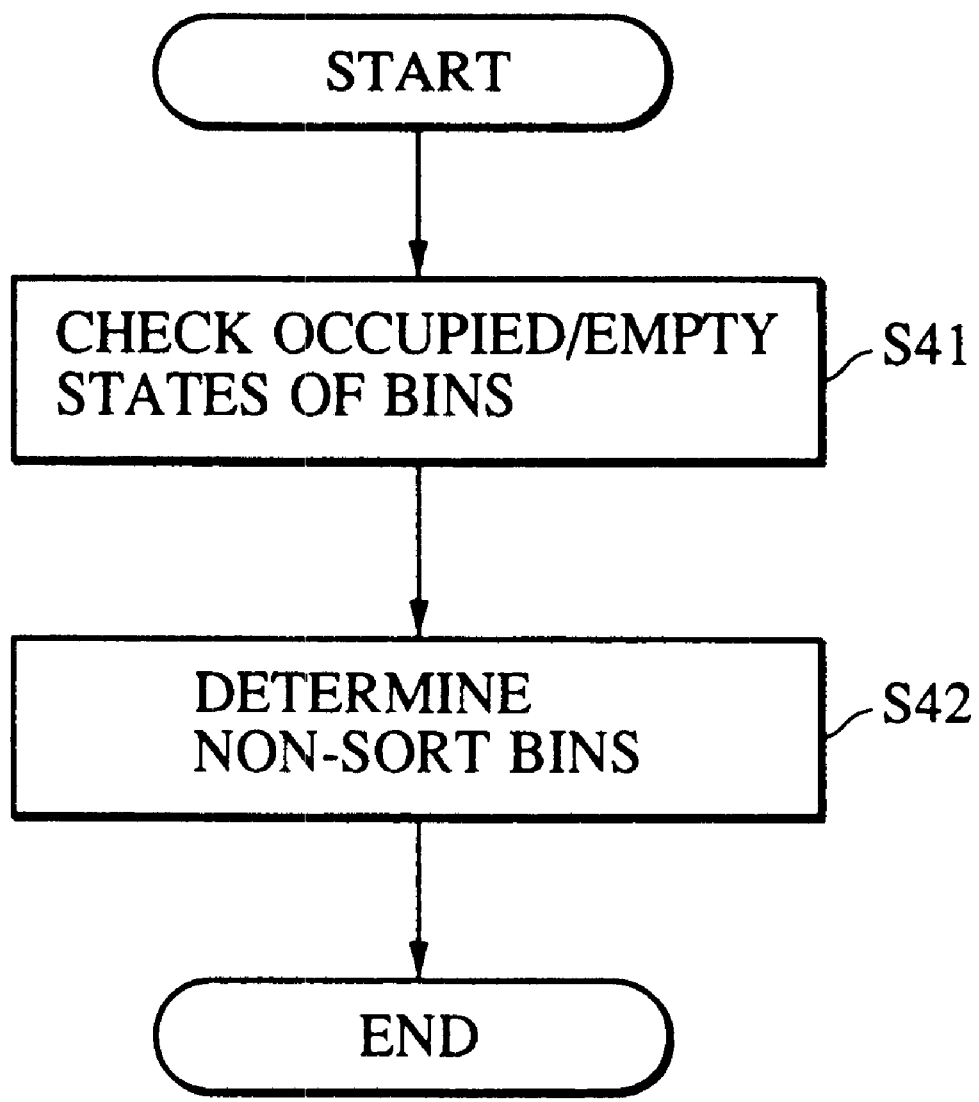
FIG. 8 is a flow chart of the overall operation for receiving recording sheets to be performed in a case where a command for appointing receptacles is not received.
Figure 9:
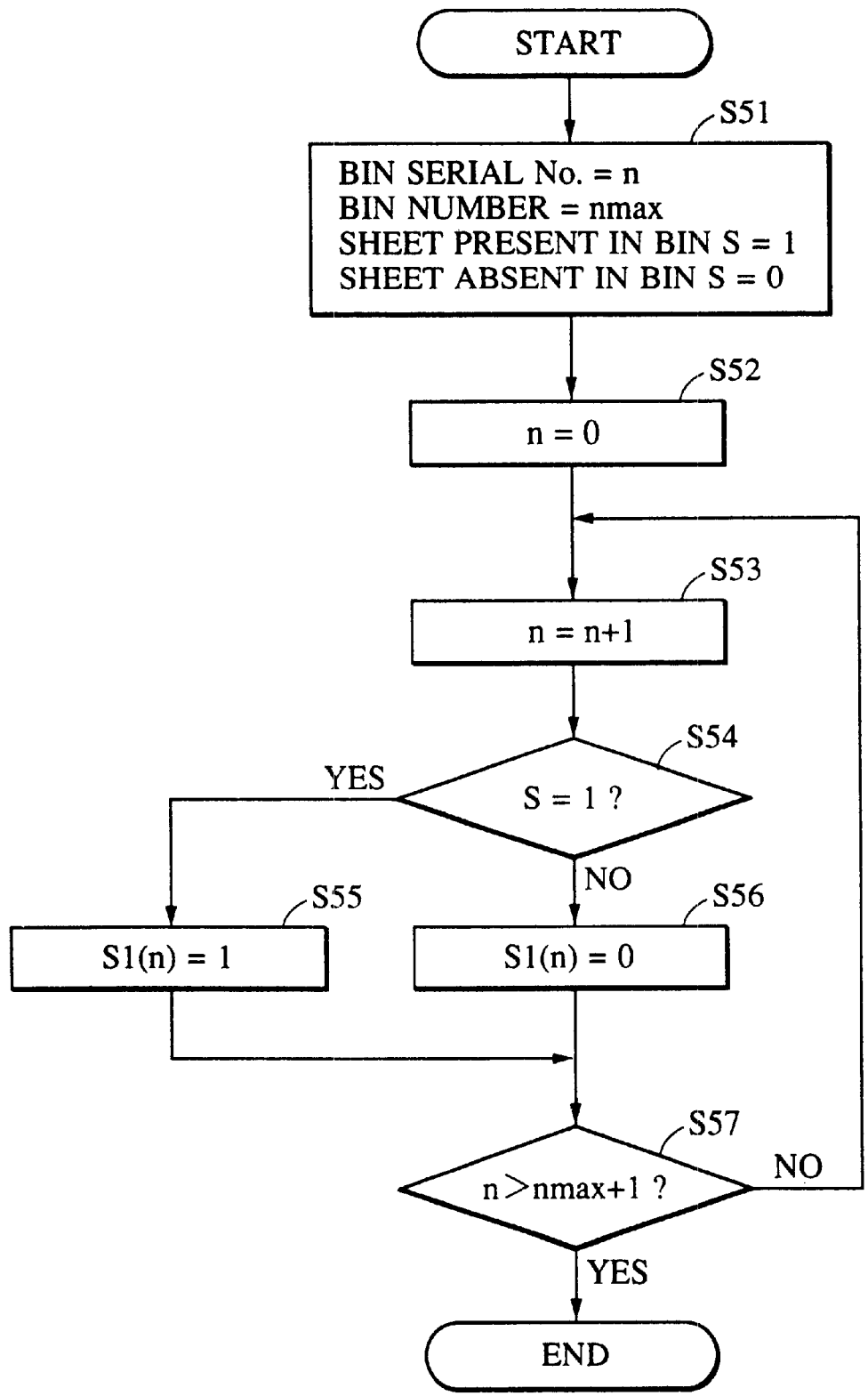
FIG. 9 is a flow chart of a bin empty state determining routine shown in FIG. 8.
Figure 10:
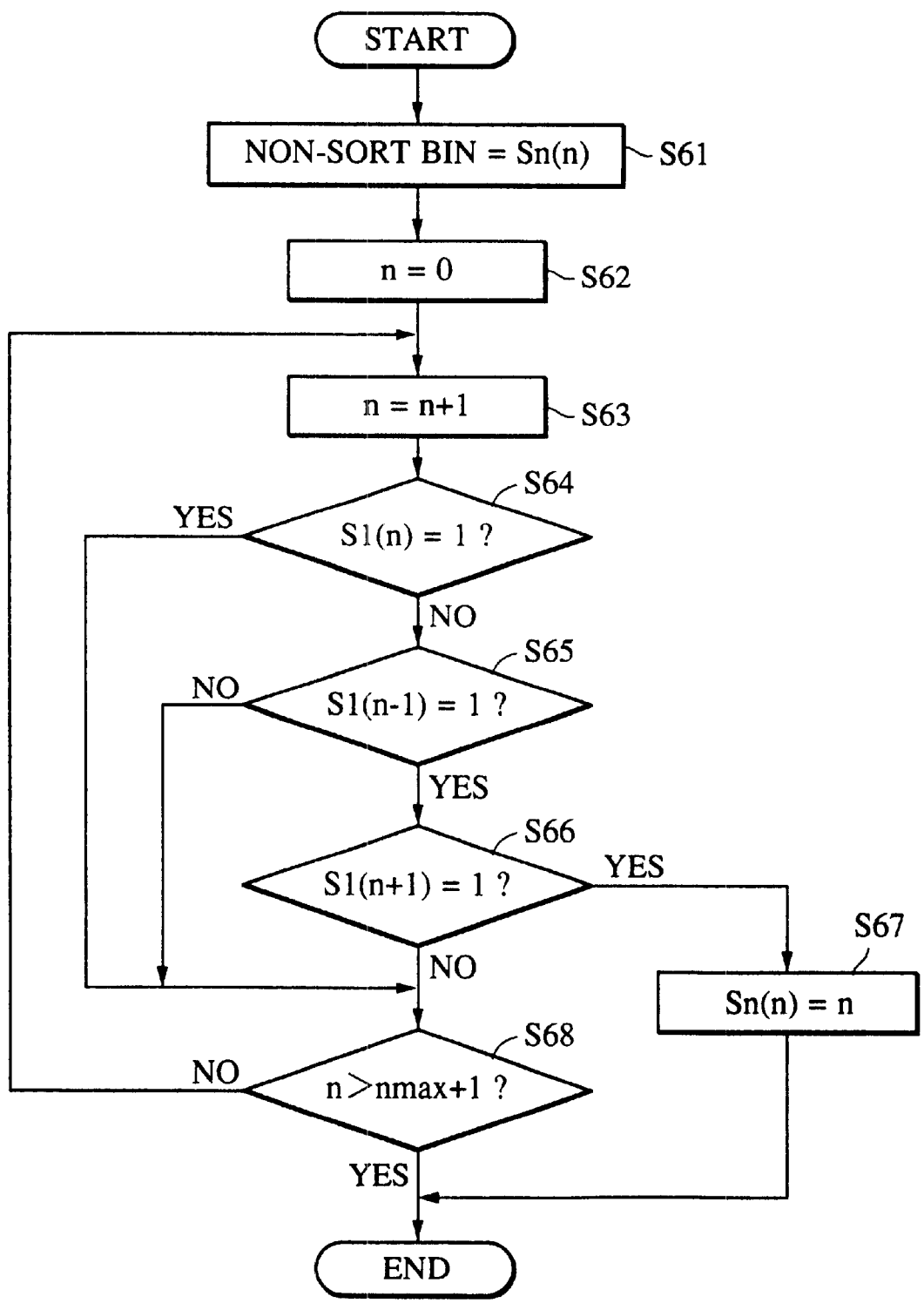
FIG. 10 is a flow chart of a non-sort bin determining routine shown in FIG. 8.

FIG. 8 is a flow chart of the non-sort bin setting process (step S14) shown in FIG. 5. FIG. 9 is a flow chart of a bin empty state determining routine shown in FIG. 8. FIG. 10 is a flow chart of a routine for determining a non-sort bin shown in FIG. 8.

As shown in FIG. 8, in the non-sort bin setting process, there are sequentially performed a bin empty state determining step (step S41) for determining whether a recording sheet exists in each of the bins 23-1 to 23-12, and a non-sort bin determining step (step S42) for determining the non-sort bin in accordance with the result of determination performed in the bin empty state determining step.

In the bin empty state determining routine shown in FIG. 9, the bin number is stored as n and the number of bins is stored as nmax in step S51; and sheet existence state S in the bin is stored such that if a sheet exists, then S=1 is stored and if no sheet exists, then S=0 is stored. Then, n is set to 0 (step S52), and n is increased by one so that n=n+1 is set (step S53).

In step S54 whether a sheet exists (S=1) in a bin of present interest is determined in accordance with information supplied from the sheet sensor of the bin of present interest. If a sheet exists, the operation proceeds to step S55. If no sheet exists, the operation proceeds to step S56.

In step S55 a determination is performed that a sheet exists in the bin of present interest and "1" is set (S1(n)=1). In step S56 a determination is performed that no sheet exists in the bin of present interest and "0" is set (S1(n)=0).

The operation proceeds to step S57 so that whether the all bins have been subjected to foregoing bin empty state determination is determined (n>nmax+1). If a non-determined bin exists, the operation returns to step S53. If all bins have been subjected to the foregoing determination, the foregoing routine is ended.

In the non-sort bin determining routine shown in FIG. 10, the non-sort bin is stored as Sn (n) (step S61), and n is set to 0 (step S62). Then, n is increased by one so that n=n+1 is set (step S63).

To search for a state where the bin of interest has no sheet and vertically adjacent bins have sheets, the following steps S64 to S68 are performed.

In step S64 a determination is performed whether the bin of present interest has been determined to have a sheet (S1(n)=1) in the foregoing bin empty state determining routine. If the foregoing bin has no sheet, the operation proceeds to step S65.

In step S65 whether a bin just upper than the bin of present interest has a sheet (S1(n−1)=1) is determined. If a sheet exists, the operation proceeds to step S66 so that whether a sheet exists (S1(n+1)=1) in the bin just below the bin of present interest is determined. If S1(n+1)=1 in step S66, the bin of interest has no sheet and the vertically adjacent bins have sheets. Therefore, the bin of present interest is determined to be the non-sort bin (Sn(n)=n) (step S67) and the foregoing routine is ended.

If S1(n)=1 in step S64, if S1(n−1)=0 in step S65 or if S1(n+1)=0 in step S66, the operation proceeds to step S68 so that whether all bins have been determined is determined (n>nmax+1). If a non-determined bin exists, the operation returns to step S63. If all bins have been determined, the foregoing routine is ended.

As described above, this embodiment enables the bins for receiving recording sheets outputted from a terminal on a network can be flexibly allotted regardless of the number of sets of sheets to be sorted appointed by a user of the network. Thus, the efficiency in using the bins in the mail box sorter 11 can be improved.

Figure 11A:
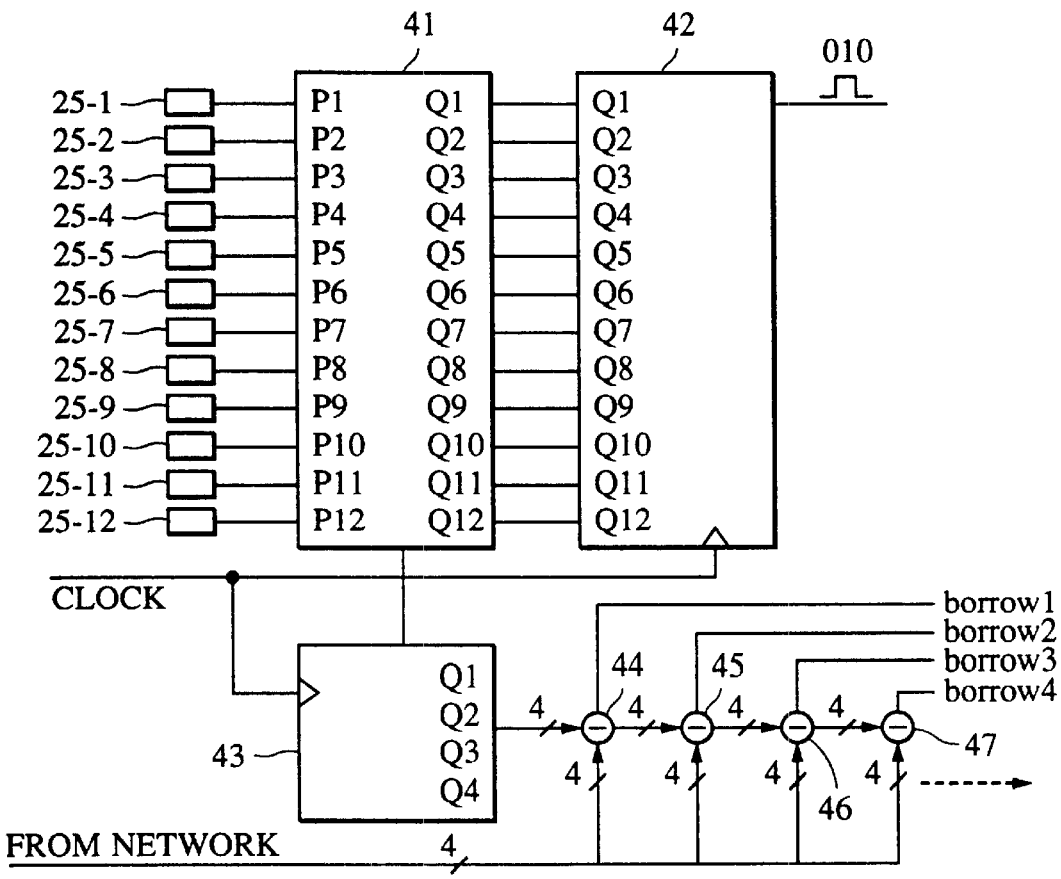
FIGS. 11(a) and 11(b) are a block diagram showing an essential structure of the information processing apparatus according to another embodiment of the present invention.
Figure 11B:
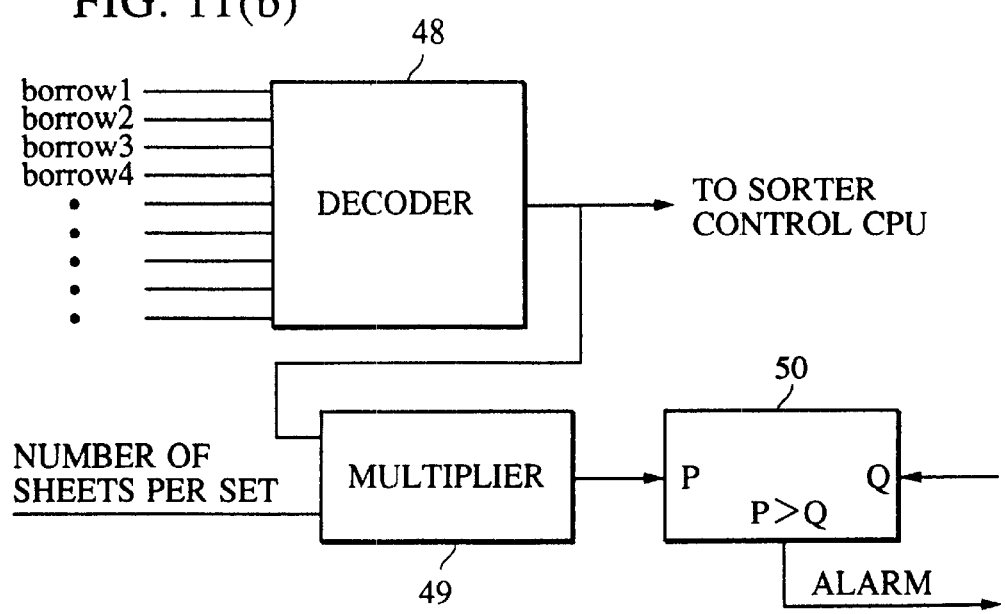

FIGS. 11A and 11B are block diagrams showing an essential portion of an information processing apparatus according to a second embodiment of the present invention.

Although the first embodiment has the structure such that the offset sort bin is determined by using a software program, this embodiment has a structure that the offset sort bin is determined by hardware.

Referring to FIG. 11A, reference numeral 41 represents a comparator, 42 represents a shift register, 43 represents a counter and 44 to 47 represent subtractors. Referring to FIG. 11B, reference numeral 48 represents a decoder, 49 represents a multiplier and 50 represents a comparator.

The comparator 41 is supplied with information about a state where a recording sheet exists in each of the bins 23-1 to 23-12 detected by the sheet sensors 25-1 to 25-12. The shift register 42 is supplied with pulses for one clock for one bin so that its output is shifted in accordance with the number of the clocks. The number of the clocks are counted by the counter 43 and the value counted by the counter 43 represents the number of bins having no sheet.

The pulses for one clock to be supplied to the shift register 42 correspond to one bin of the mail box sorter 11 in a physical viewpoint. By sequentially shifting the pulses for one clock, bins of the mail box sorter 11 having no sheet are searched.

By using the subtractors 44 to 47 to subtract the number obtained by the counter 43 from the number of the sets of sheets appointed from the network 10, the number of sets to be offset-sorted is determined. Borrow signals, each indicating whether the result of the subtraction is a minus value, are fetched from the subtractors 44 to 47.

By decoding the plural borrow signals by the decoder 48, they are converted into the number of sets of sheets to be offset-sorted, that is, a sub-set code, which is then transmitted to the sorter controlling CPU 32. The multiplier 49 multiplies the number of sets and the number of sheets in one set to monitor the maximum number of sheets, which can be received by the receptacle. If the number of sheets is larger than the maximum number of sheets, which can be received, alarm signal ALARM is transmitted from the comparator 50.

The thus-determined offset bin displays, on the display portion thereof, the ID of a user and the number of sets as shown in FIG. 6.

Another embodiment will now be described. This embodiment has the structure which is the same shown in FIGS. 1 to 3.

The sorter controlling CPU 32 is a CPU for controlling the communication between the body of the copying machine 12 and the mail box sorter 11. The sorter controlling CPU 32 detects a state where a sheet exists in each of receptacles 23-1 to 23-12 and counts the total number of the recording sheets received by the receptacles 23-1 to 23-12. Moreover, the sorter controlling CPU 32 responds to the command for appointing receptacles issued by the external-unit controlling CPU 31 so as to perform control for maximizing the productivity in the sorting operation.

The sorter controlling CPU 32 comprises a selection control means (see FIGS. 4 to 6) for selecting a predetermined receptacle as a non-sort bin from the receptacles 23-1 to 23-12 in accordance with information indicating whether sheets exist and supplied from the sheet sensor 26 when the command for appointing receptacles has not been supplied. When the command for appointing receptacles has not been supplied, the recording sheets are discharged to the receptacle (the non-sort bin) selected by the selection control means.

The operation (an information processing method) of this embodiment will now be described.

A state where no sheet exists in the mail box sorter 11 is determined to be an initial state. In this embodiment, an image processed by the terminal computer 13 is, in the foregoing initial state, transmitted to the copying machine 12, and the recording sheets are sorted into 6 bins from a fifth bin (the receptacle 23-5) to a tenth bin (the receptacle 23-10).

When an image is transmitted from the facsimile apparatus 17, which has not the function for issuing the command for appointing receptacles, and thus the recording sheets are, through the copying machine 12, outputted so as to be received by the mail box sorter 11, the recording sheets are received by the first bin (the receptacle 23-1) to the fourth bin (the receptacle 23-4) or the eleventh bin (the receptacle 23-11) to the twelfth bin (the receptacle 23-12).

Figure 12:
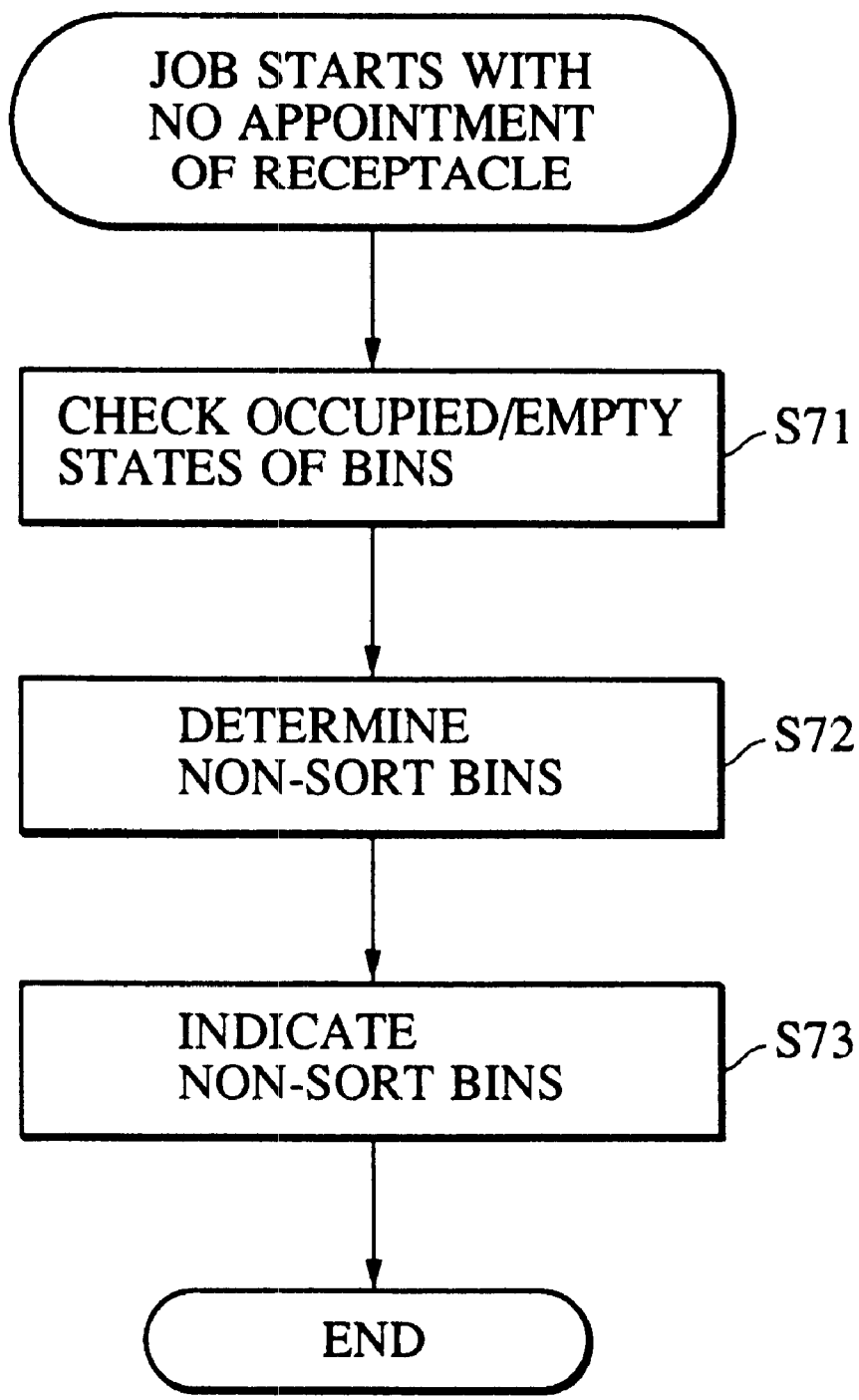
FIG. 12 is a flow chart showing the overall operation for receiving recording sheets to be performed in a case where a command for appointing receptacles is not received.
Figure 13:
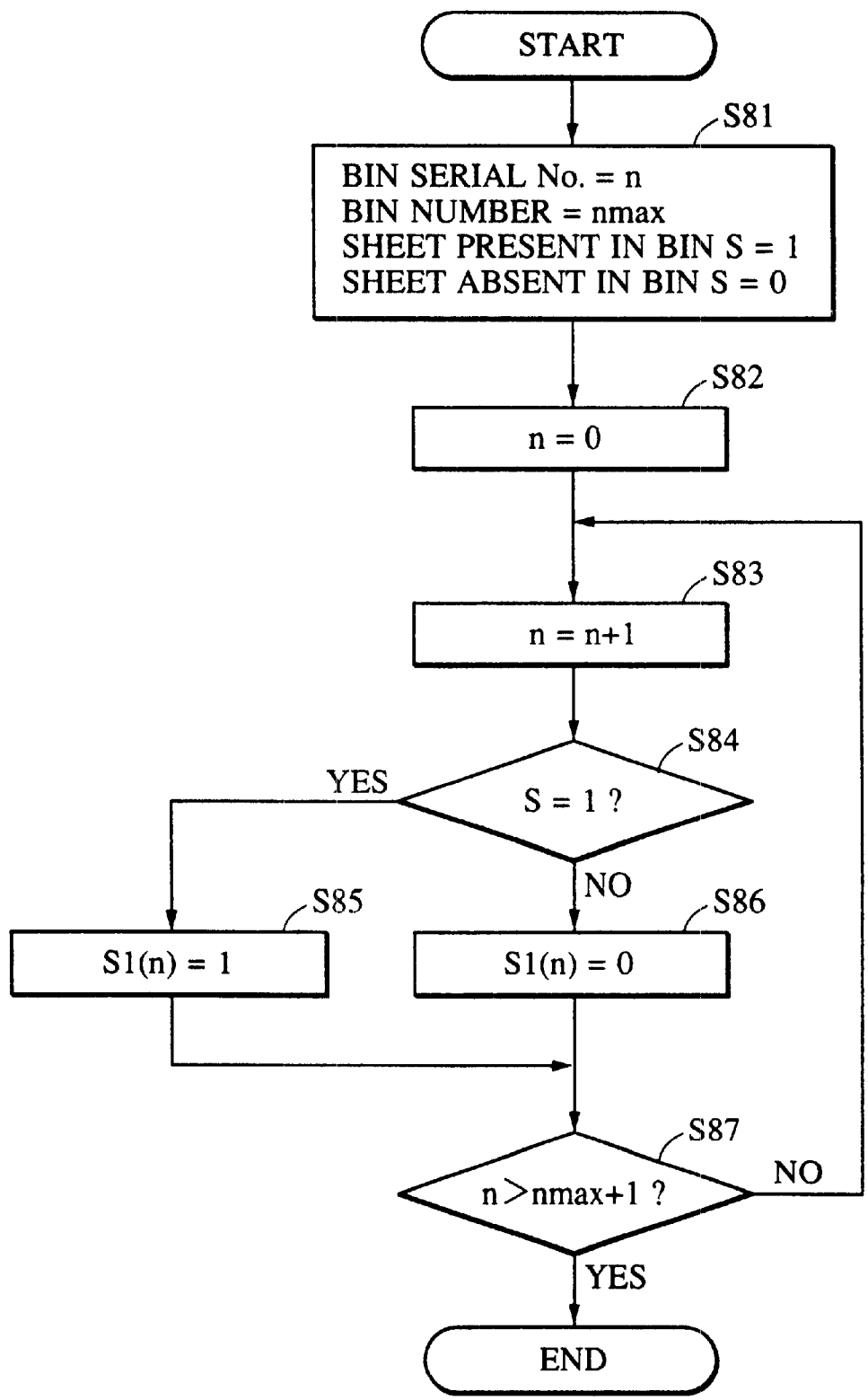
FIG. 13 is a flow chart of a bin empty state determining routine shown in FIG. 4.
Figure 14:
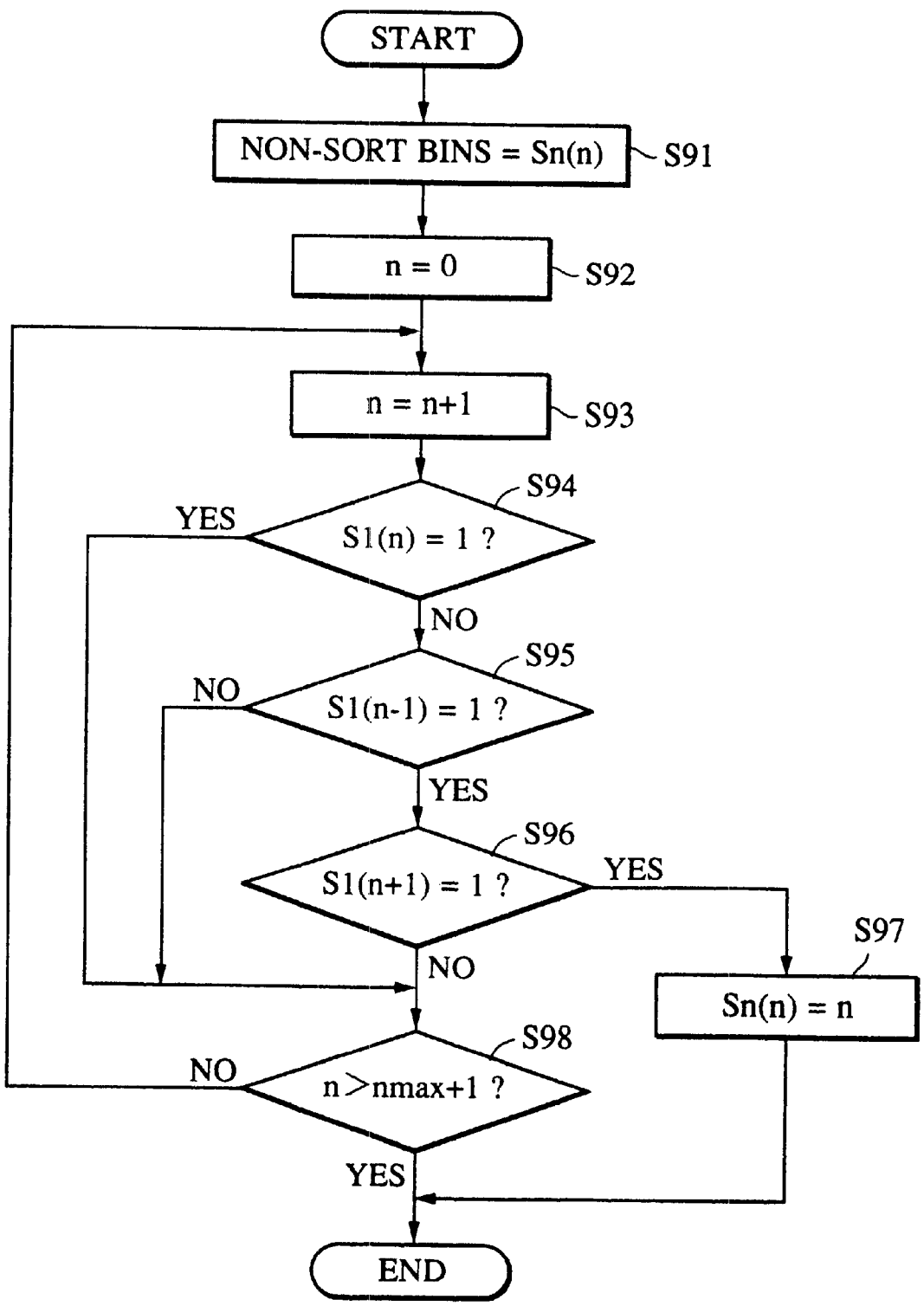
FIG. 14 is a flow chart of the non-sort bin determining routine shown in FIG. 4.

If the external unit has no function of issuing the command for appointing receptacles or has not issued the command for appointing receptacles, that is, if the command for appointing receptacles has not been issued from the external unit and therefore the command for appointing receptacles has not been received, the recording sheets are received by determining the non-sort bin in accordance with a flow chart shown in FIGS. 12, 13 and 14. FIG. 12 is a flow chart of the recording sheet receiving operation to be performed when the command for appointing receptacles has not been received. FIG. 13 is a flow chart of a bin empty state determining routine shown in FIG. 12. FIG. 14 is a flow chart of a non-sort bin determining routine shown in FIG. 12.

As shown in FIG. 12, the operation for receiving recording sheets to be performed when the command for appointing receptacles has not been received comprises three steps. That is, the operation consists of a bin empty state determining step (step S71) for determining whether a recording sheet exists in each of the bins 23-1 to 23-12, a non-sort bin determining step (step S72) for determining the non-sort bin in accordance with the result of determination performed in the bin empty state determining step, and a non-sort bin display step (step S73) for displaying the determined bin being a non-sort bin.

In the bin empty state determining routine shown in FIG. 13, the bin number is stored as n and the number of bins is stored as nmax in step S81; and sheet existence state S in the bin is stored such that if a sheet exists, then S=1 is stored and if no sheet exists, then S=0 is stored. Then, n is set to 0 (step S82), and n is increased by one so that n=n+1 is set (step S83).

In step S84 whether a sheet exists (S=1) in a bin of present interest is determined in accordance with information supplied from the sheet sensor of the bin of present interest. If a sheet exists, the operation proceeds to step S85. If no sheet exists, the operation proceeds to step S86.

In step S85 a determination is performed that a sheet exists in the bin of present interest and "1" is set (S1(n)=1). In step S86 a determination is performed that no sheet exists in the bin of present interest and "0" is set (S1(n)=0).

The operation proceeds to step S87 so that whether the all bins have been subjected to foregoing bin empty state determination is determined (n>nmax+1). If a non-determined bin exists, the operation returns to step S83. If all bins have been subjected to the foregoing determination, the foregoing routine is ended.

In the non-sort bin determining routine shown in FIG. 14, the non-sort bin is stored as S(n) (step S91), and n is set to 0 (step S92). Then, n is increased by one so that n=n+1 is set (step S93).

To search for a state where the bin of interest has no sheet and vertically adjacent bins have sheets, the following steps S94 to S98 are performed.

In step S94 a determination is performed whether the bin of present interest has been determined to have a sheet (S1(n)=1) in the foregoing bin empty state determining routine. If the bin has no sheet, the operation proceeds to step S95.

In step S95 whether a bin just upper than the bin of present interest has a sheet (S1(n−1)=1) is determined. If a sheet exists, the operation proceeds to step S96 so that whether a sheet exists (S1(n+1)=1) in the bin just below the bin of present interest is determined. If S1(n+1)=1 in step S96, the bin of interest has no sheet and the vertically adjacent bins have sheets. Therefore, the bin of present interest is determined to be the non-sort bin (Sn(n)=n) (step S97) and the foregoing routine is ended.

If S1(n)=1 in step S94, if S1(n−1)=0 in step S95 or if S1(n+1)=0 in step S96, the operation proceeds to step S98 so that whether all bins have been determined is determined (n>nmax+1). If a non-determined bin exists, the operation returns to step S93. If all bins have been determined, the foregoing routine is ended.

Figure 15:
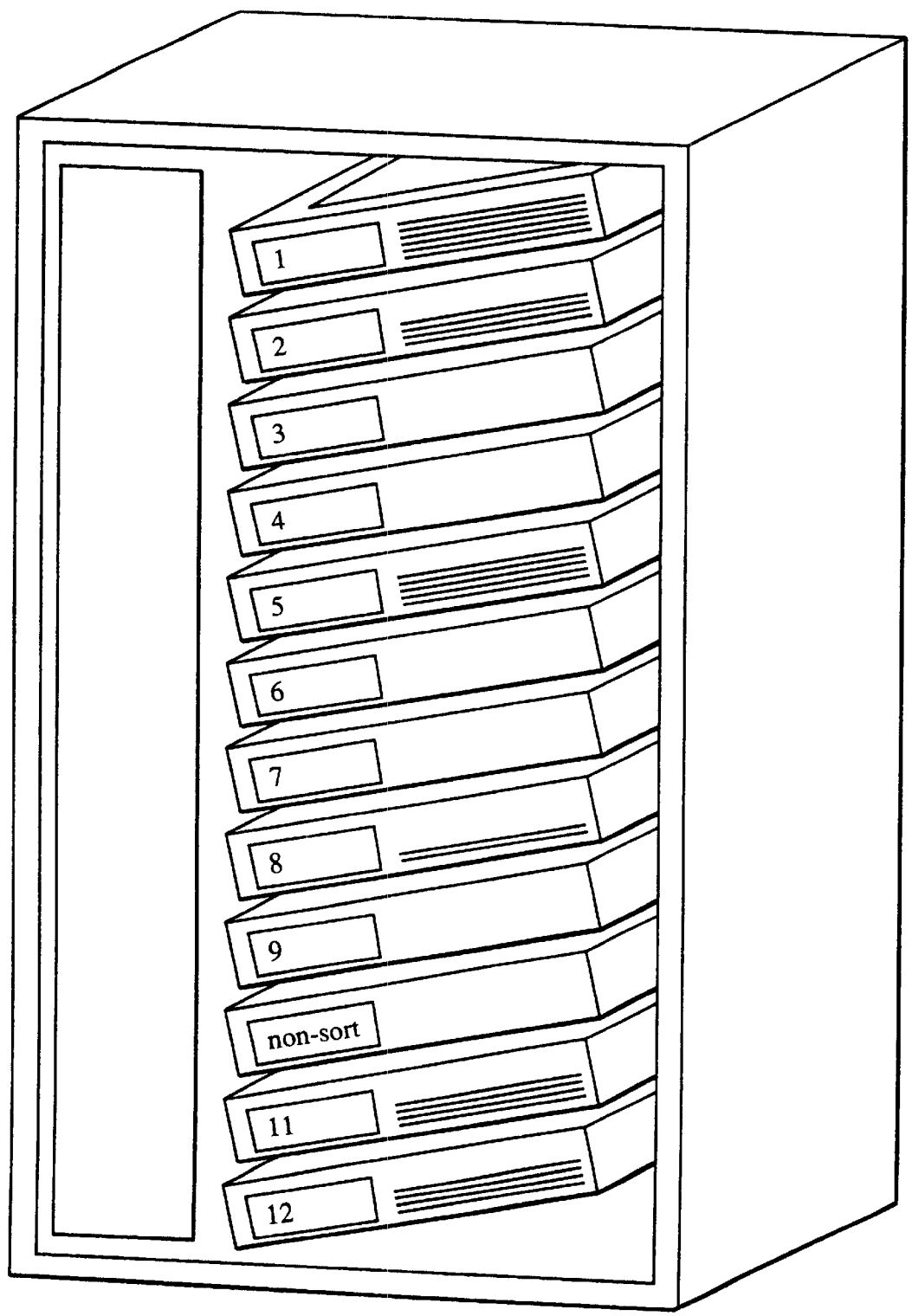
FIG. 15 is a diagram showing an example of display of a non-sort bin.

The thus-determined non-sort bin is displayed, for example, as shown in FIG. 15. FIG. 15 shows an example in which the tenth bin is determined to be the non-sort bin.

As described above, this embodiment enables the non-sort bin to flexibly be allotted in accordance with the state of receipt in each receptacle. Thus, the efficiency in using the bins in the mail box sorter 11 can be improved.

Figure 16:
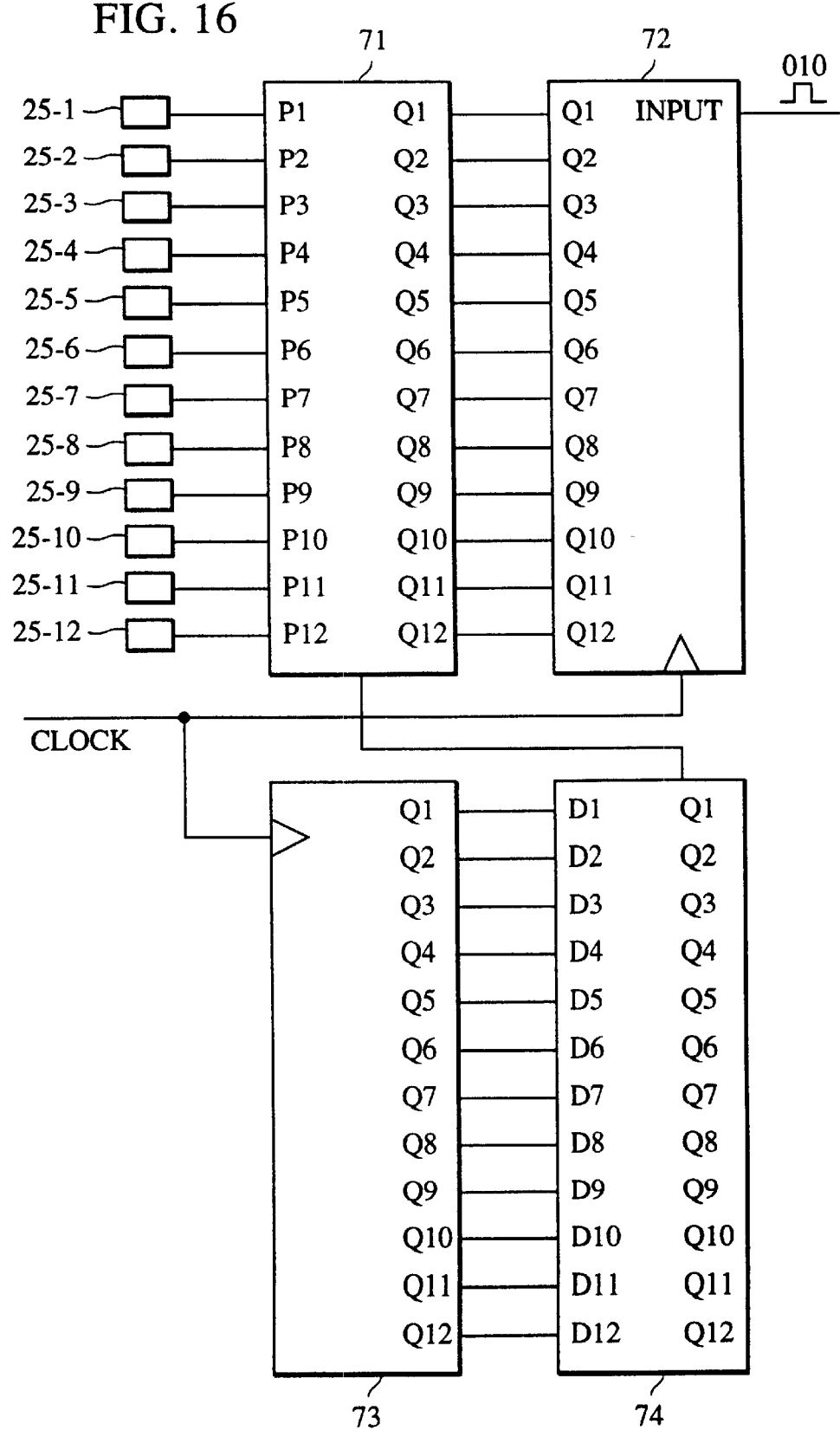
FIG. 16 is a block diagram showing a schematic structure of another embodiment of the present invention.

FIG. 16 is a block diagram showing an essential portion of the structure of the information processing apparatus according to another embodiment.

Although the foregoing embodiment has the structure such that the non-sort bin is determined by using a software program, this embodiment has a structure that the non-sort bin is determined by hardware.

Referring to FIG. 16, reference numeral 71 represents a comparator, 72 represents a shift register, 73 represents an up-counter, and 74 represents a D-latch.

The comparator 71 is supplied with information about a state where a recording sheet exists in each of the bins 23-1 to 23-12 detected by the sheet sensors 25-1 to 25-12. The shift register 72 is supplied with pulses for one clock for one bin so that its output is shifted in accordance with the number of the clocks.

The comparator 71 subjects the outputs from the sheet sensors 25-1 to 25-12 and the output from the shift register 72 to a comparison so that the comparator 71 transmits a coincidence signal only when the bin of interest has no sheet and the vertically adjacent bins have sheets.

The number of the clocks are counted by the counter 73 and the contents of the D-latch 74 are rewritten in response to the coincidence signal supplied from the comparator 71. The count of pulses obtained by the counter 73 and the bin address are the same.

The pulses for one clock to be supplied to the shift register 72 as described above correspond to one bin of the mail box sorter 11 in a physical viewpoint. By sequentially shifting the pulses for one clock, the state where the bin of interest of the mail box sorter 11 has no sheet and the vertically adjacent bins have sheets is searched. When the foregoing state is searched, the bin of interest is determined to be the non-sort bin.

If a plurality of the foregoing state exist, the bin of interest in the final state is determined to be the non-sort bin. If the state where the vertically adjacent bins have sheets and the bin of interest has no sheet does not exist, the final bin is determined to be the non-sort bin. Then, inhibition of appointment of the determined non-sort bin is notified to the terminals on the network having the driver software.

Since the structure of this embodiment employs the up-counter and increment of the bin number, the bin having the largest bin address among the bins of interest having no sheet is automatically determined to be the non-sort bin. However, the determination of the non-sort bin is not limited to this if a down-counter is used or another address determining means is employed.

Another embodiment of the present invention will now be described. Also in this embodiment, the structure is the same as that shown in FIGS. 1 to 3.

The external-unit controlling CPU 31 is a CPU for controlling external units, that is, the terminal computers 13, 14 and 15, the facsimile apparatus 17 and the printer 18. The external-unit controlling CPU 31 transmits a control signal from the body of the copying machine 12 to the sorter controlling CPU 32. The external-unit controlling CPU 31 controls a printing standby state, a state of use of the network 10, a state of bins which are being used, the count of recording sheets, a state of recording sheets (whether a single sheet or a bundle of sheets) and the count of the sheet sets. Moreover, the external-unit controlling CPU 31 receives a printer driver command for appointing the receptacle for receiving recording sheets issued by the external unit connected to the network 10. The printer driver command is an output command (including a command to appoint the number of sets of sheets, and a command for appointing receptacles) issued by any one of the external units. A printer driver command from an external unit, which cannot appoint the receptacle, does not include the command for appointing receptacles.

The sorter controlling CPU 32 is a CPU for controlling the communication between the body of the copying machine 12 and the mail box sorter 11. The sorter controlling CPU 32 detects a state where a sheet exists in each of receptacles 23-1 to 23-12 and counts the total number of the recording sheets received by the receptacles 23-1 to 23-12. Moreover, the sorter controlling CPU 32 responds to the command for appointing receptacles issued by the external-unit controlling CPU 31 so as to perform control for maximizing the productivity in the sorting operation.

The sorter controlling CPU 32 comprises a selection control means for selecting a predetermined receptacle from the plural receptacles 23-1 to 23-12 in accordance with information supplied from the sheet sensors 25-1 to 25-12 if the command for appointing receptacles has not been supplied when an image has been supplied from the external unit; and a priority-order determining means for determining the priority order of the use-permitted receptacles including the predetermined receptacle selected by the selection control means with respect to the external unit in accordance with the state of use of the apparatus.

The operation (an information processing method) of this embodiment will now be described.

Figure 17:
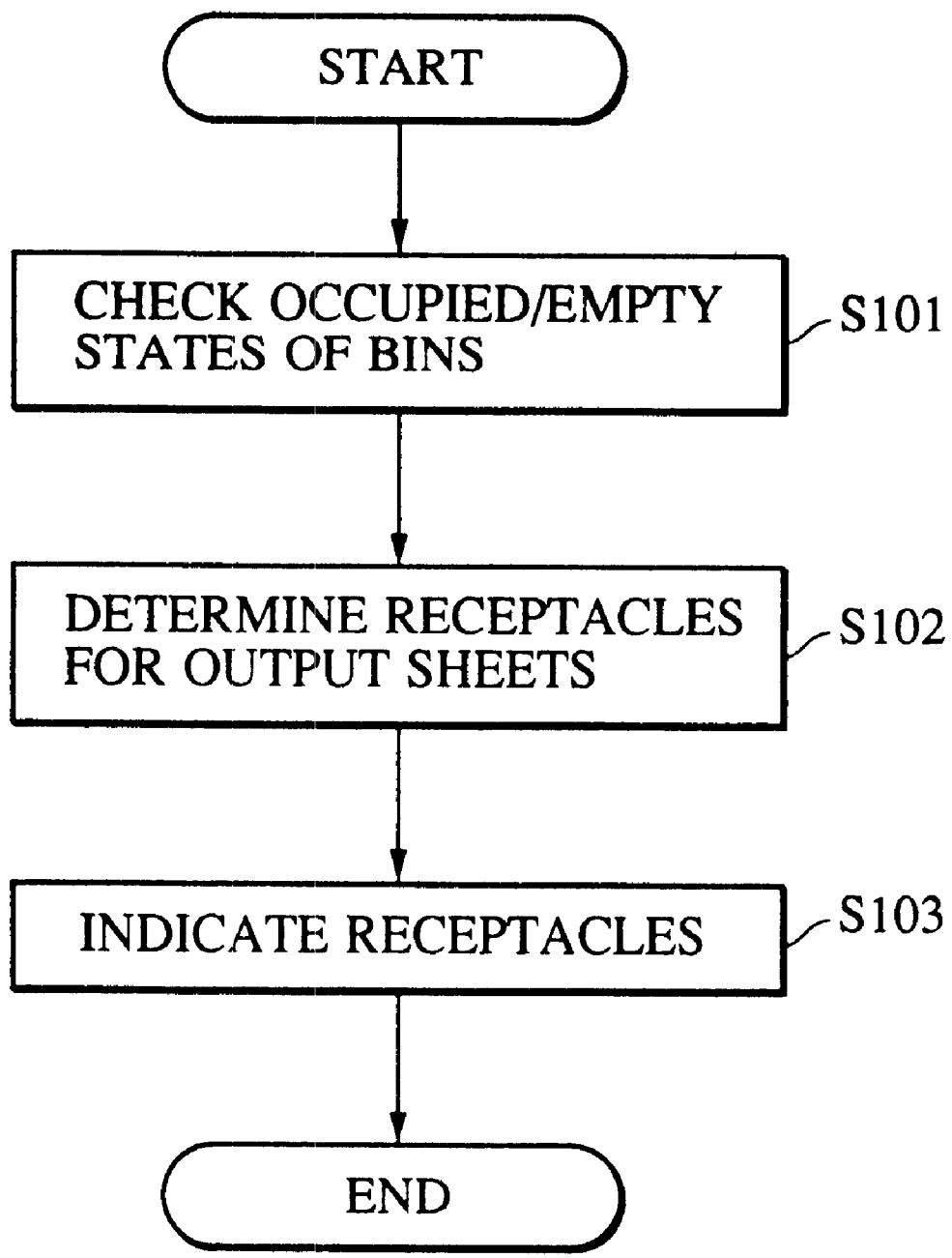
FIG. 17 is a basic flow chart of recording sheet receptacle determination control according to the foregoing embodiment.
Figure 18:
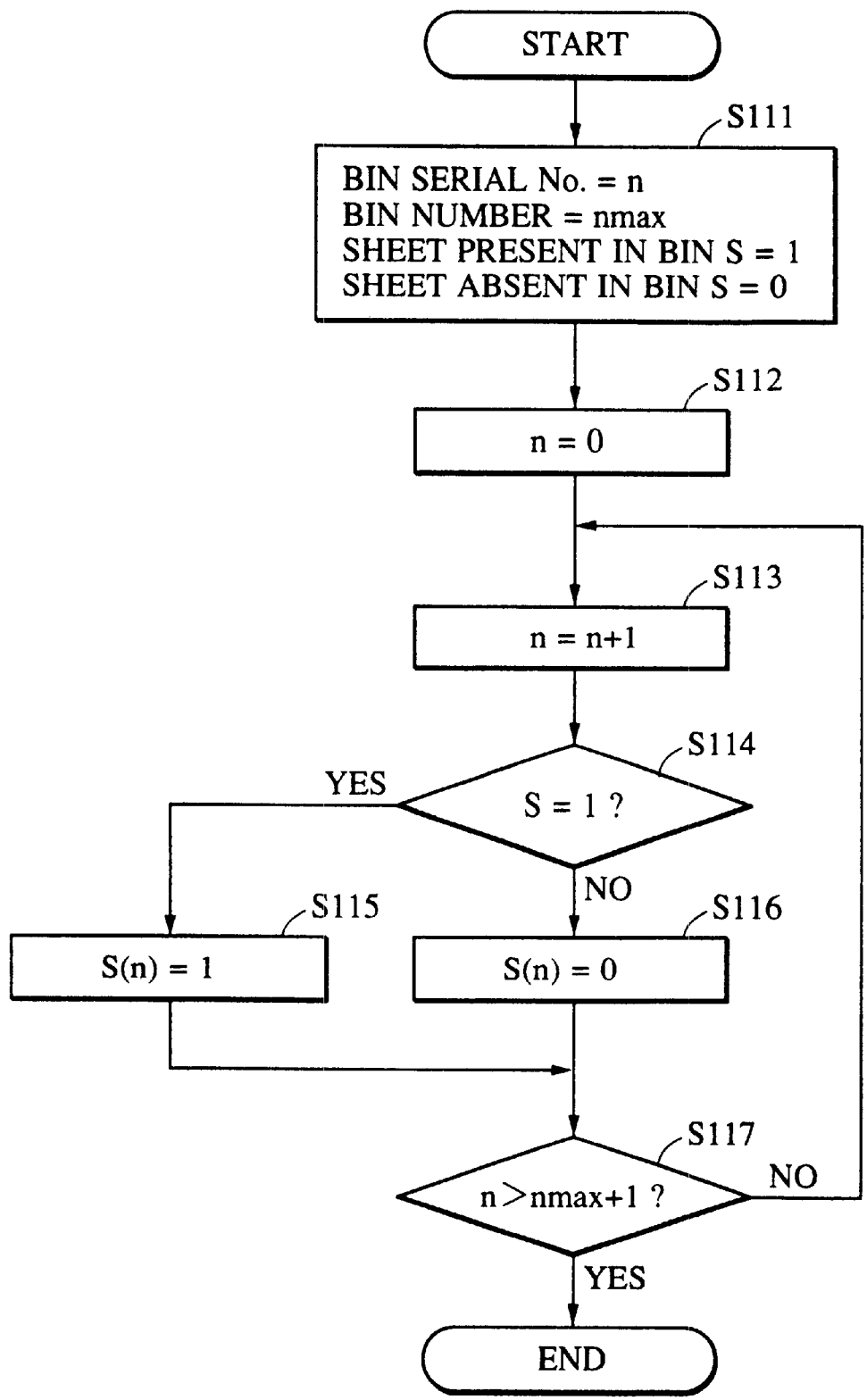
FIG. 18 is a flow chart of the bin empty state determining routine shown in FIG. 4.
Figure 19:
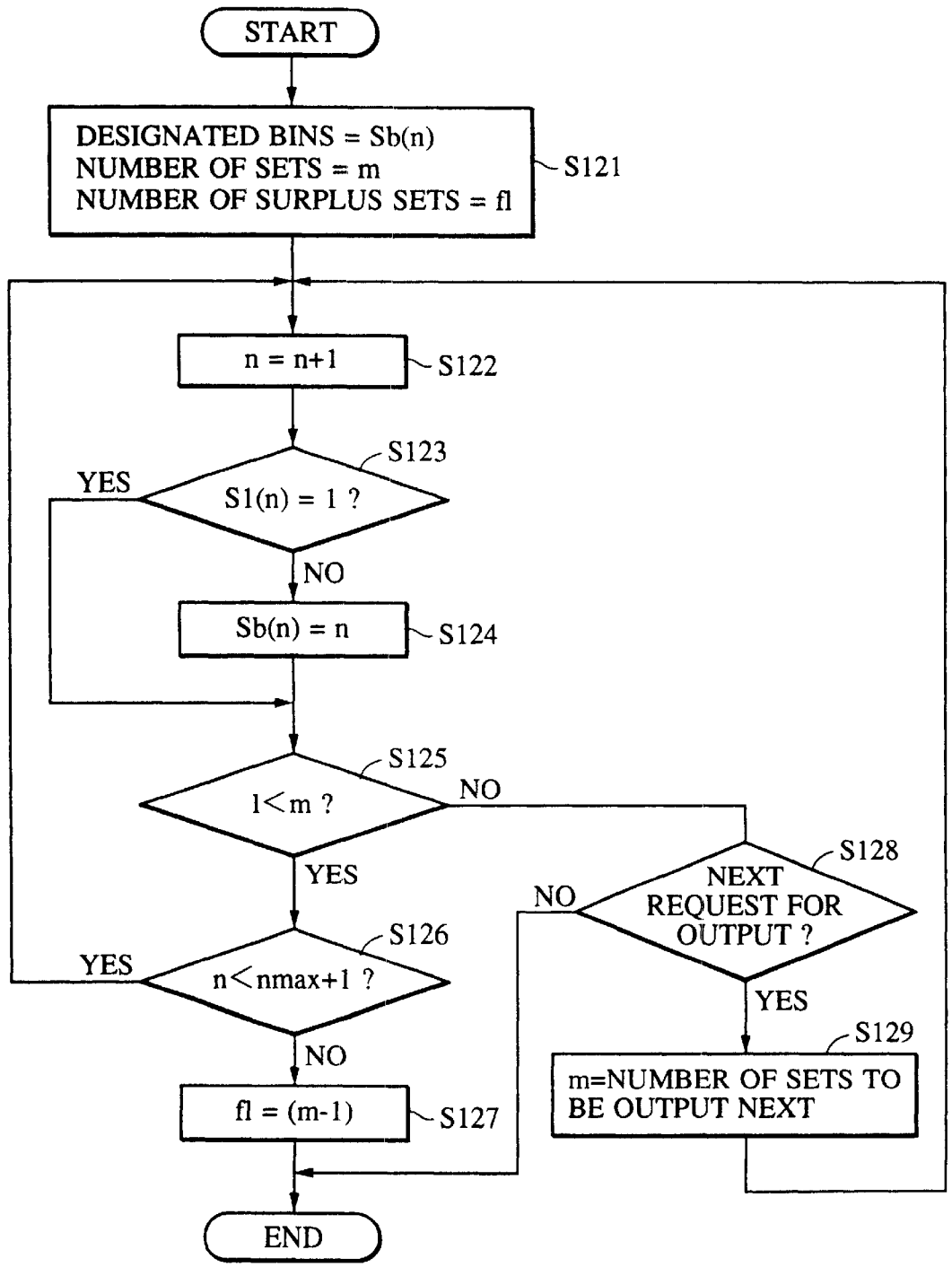
FIG. 19 is a flow chart showing a recording sheet receptacle determining routine.

The control for determining the receptacles for receiving the recording sheets according to this embodiment is performed in accordance with a flow chart shown in FIGS. 17, 18 and 19. FIG. 17 is a basic flow chart of the control for determining the recording sheet receptacles. FIG. 18 is a flow chart of a routine for determining the bin empty state shown in FIG. 17. FIG. 19 is a flow chart of a routine for determining the receptacles for receiving the recording sheets.

As shown in FIG. 17, the control of the determination of the recording sheet receptacle consists of three steps. That is, a bin empty state determining routine (step S101) for determining whether a recording sheet exists in each of the bins 23-1 to 23-12, a recording sheet receptacle determining routine (step S102) for determining the recording sheet receptacles in accordance with the result of the determination performed in the bin empty state determining routine, and a recording sheet receptacle display routine (step S103) for transmitting, to the external unit, information about the determined receptacles and displaying the same.

In the bin empty state determining routine shown in FIG. 18, initialization is performed in steps S111 and S112. That is, the bin number is stored as n and the number of bins is stored as nmax in step S111; and sheet existence state S in the bin is stored such that if a sheet exists, then S=1 is stored and if no sheet exists, then S=0 is stored. Then, n is set to 0 in step S112, and bin number n is increased by one so that n=n+1 is set in step S113. In step S114 whether a sheet exists (S=1) in a bin of present interest is determined in accordance with information supplied from the sheet sensor of the bin of present interest. If a sheet exists, the operation proceeds to step S115. If no sheet exists, the operation proceeds to step S116.

In step S115 a determination is performed that a sheet exists in the bin of present interest and "1" is set (S1(n)=1). In step S116 a determination is performed that no sheet exists in the bin of present interest and "0" is set (S1(n)=0). The operation proceeds to step S117 so that whether the all bins have been subjected to foregoing bin empty state determination is determined (n>nmax+1). If a non-determined bin exists, the operation returns to step S113. If all bins have been subjected to the foregoing determination, the foregoing routine is ended.

In the recording sheet receptacle determining routine shown in FIG. 19, the bin number (Sb(n)) of the recording sheet receptacle is stored in step S121. Then, the number m of sets of sheets to be outputted, which has been required from the external units and number f1 of surplus sets generating if the number of sets is larger than the number of empty bins are set. In step S122 the bin number is increased by one (n=n+1), and the operation proceeds to step S123.

In step S123 the state of the bin of present interest is determined in accordance with information about whether a sheet exists in each bin determined in the bin empty state determining routine. If the foregoing bin has no sheet, the bin number is stored in the bin number Sb(n) for receiving the recording sheets in step S124.

In step S125 whether receptacles for all sets of sheets have been determined is determined. If the determination has not been performed, whether the bin number of the bin of present interest coincides with the number of all bins is determined in step S126. If they do not coincide with each other (n<nmax+1), the operation returns to step S121. If they coincide with each other, the number of the bins is smaller than the number of the sets of sheets and a surplus number of sets exists. Therefore, the number (m−1) of the surplus sets is stored as the number f1 of the surplus set (step S127) and this routine is ended.

If the determination process in step S125 has been performed that the receptacles for all sets have been determined, information indicating whether standby for a next output exists is acquired from the external-unit controlling CPU 31 shown in FIG. 3 (step S128). If any standby unit does not exist, this routine is ended. If the standby state exists, the operation proceeds to step S129 so that the number of sets waiting for a next output is read from the external-unit controlling CPU 31, the read number of sets being stored as the number m of sets. Then, the operation returns to step S122.

In the recording sheet receptacle display routine (step S101), information about the recording sheet bin for each set determined in the recording sheet receptacle determining routine and information about the sets, which cannot be received, are received. As for the sets, the receptacles of which have been determined, information about the receptacle for each set is, through the network, transmitted to the external unit. The external unit displays the supplied information.

In the foregoing system environment, an assumption is performed that the terminal computer 13 having printer driver software capable of appointing the receptacle has transmitted, to the copying machine 12, data of an image processed by the terminal computer 13 such that the bins 23-1 to 23-5 receive five sets of sheets. Another assumption is performed that the terminal computer 14 having the printer driver software has appointed output of two sets of sheets of an image processed by the terminal computer 14 and the terminal computer 15 has appointed output of one set of sheets of an image fetched from the scanner 16 without appointment of the receptacle.

At this time, an assumption is performed that all bins have no sheet in the initial state, and the control for determining the recording sheet receptacle shown in FIG. 17 is started and a determination is performed in the bin empty state determining routine that all bins have no sheet. In the recording sheet receptacle determining routine, the receptacle for receiving the recording sheets from each external unit is determined. In this embodiment, an assumption is performed that the output commands are received by the copying machine 12 in a sequential order as the terminal computer 13, the terminal computer 14 and the terminal computer 15. Thus, in step S121 shown in FIG. 19, m=5 is stored so that recording sheets from the terminal computer 13 are received by the bins 23-1 to 23-5 in accordance with the flow shown in FIG. 19.

Since a next terminal which intends to output the recording sheets exists in step S128 (the terminal computer 14 waits for outputting), two sets of sheets to be outputted from the terminal computer 14 is set to m in step S129. Thus, recording sheets outputted from the terminal computer 14 are received by the bins 23-6 to 23-7 in accordance with the flow shown in FIG. 19. Similarly, recording sheets from the terminal computer 15 are received by the bin 23-8.

As described above, according to this embodiment, the receptacles for receiving the recording sheets outputted from each external unit can automatically be determined regardless of whether the command for appointing receptacles has been issued from an external unit, and the recording sheets can continuously be sorted.

Another embodiment of the present invention will now be described.

This embodiment has a structure such that even if the same receptacles for receiving recording sheets outputted from external units, capable of appointing the receptacles, are appointed the priority order is determined and the external unit, whose output receptacle is changed, is supplied with information about the change and the determined receptacles.

An assumption is performed that the external-unit controlling CPU 31 has received, from the terminal computer 13, an output command for appointing receptacles such that five sets of recording sheets of an image processed by the terminal computer 13 are received by the first to fifth bins. Simultaneously, another assumption is performed that the terminal computer 15 has issued an output command for appointing receptacles such that three sets of recording sheets of an image fetched by the scanner 16 are received by the first to third bins. In the foregoing case, since the same receptacles are appointed by the two external units, either of the two commands must be given priority. In this case, an assumption is performed that the output command from the terminal computer 13 has been issued first, and the first output command is given priority.

Specifically, the external-unit controlling CPU 31, which has received the output command from the external unit, acquires, from the output command, the number of sets and the printer driver command, such as a command for appointing receptacles. In this embodiment, information indicating that the contents of the command from the terminal computer 13 are such that the sets of sheets to be sorted is five and the first to fifth bins are appointed to receive the recording sheets.

In accordance with the bin empty state determining routine shown in FIG. 18, a determination is performed that all bins in the mail box sorter 11 have no sheet. In accordance with the recording sheet receptacle determining routine shown in FIG. 19, the receptacle for receiving sheets to be outputted from the terminal computer 13 are determined to be the first to fifth bins. In accordance with the recording sheet receptacle display routine (step S103 shown in FIG. 17), the recording sheet receptacles being the first to fifth bins is notified to the terminal computer 13 through the network 10.

Then, information is received which indicates that the contents of the command issued by the terminal computer 15 are such that the number of sets is three and the appointed receptacles are the first to third bins. Since the recording sheets of data from the terminal computer 13 have been maintained in the receptacles, the first to fifth bins in the mail box sorter 11 cannot be used in accordance with the bin empty state determining routine and the sixth to twelfth bins can be used.

As a result, the receptacles for receiving the recording sheets of data from the terminal computer 15 are determined to be the sixth to eighth bins in accordance with the routine for determining the recording sheet receptacles. Then, in accordance with the recording sheet receptacle display routine, information about change of the recording sheet receptacles from the appointed first to third bins to the sixth to eighth bins is transmitted through the network 10.

Another embodiment will now be described.

This embodiment has a structure such that the information processing system according to the foregoing embodiments is arranged in such a manner that if the recording sheet receptacles have not been appointed by the external unit, usable receptacles (receptacles permitted to be used) are allotted in the descending order. Specifically, a routine for determining the recording sheet receptacles is formed by combining the routines shown in FIGS. 19 and 20.

Figure 20:
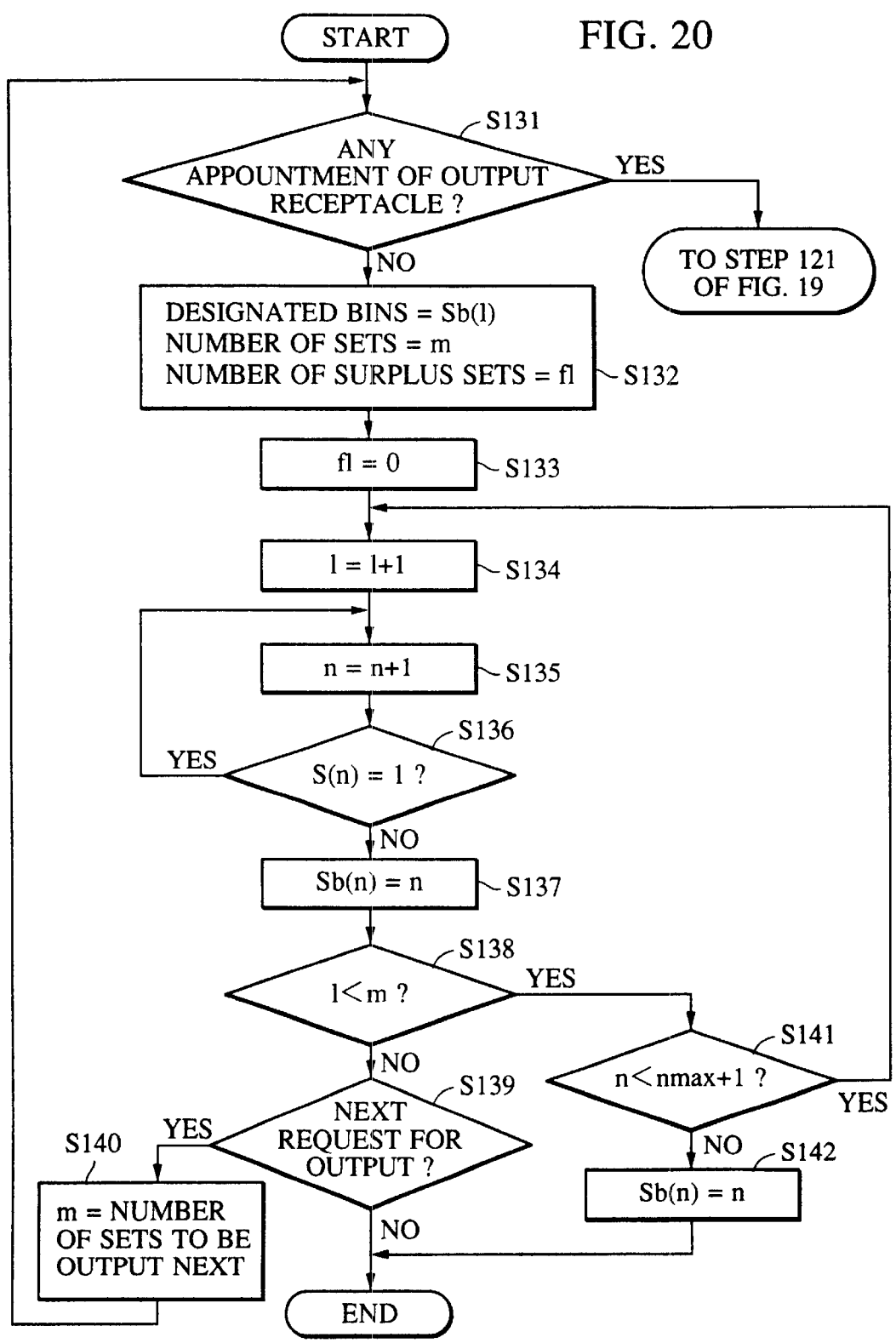
FIG. 20 is a flow chart of a recording sheet receptacle determining routine according to another embodiment of the present invention.

Referring to FIG. 20, in step S131 whether an appointment of an output, that is, an appointment of receptacles is contained in the printer driver command received from an external unit is determined. If no receptacle has been appointed, a determination is performed that the external unit has not appointed a receptacle. Then, the operation proceeds to step S132 and following steps to give a priority to the output from the foregoing external unit. If the output has been appointed, the operation proceeds to step S121 shown in FIG. 19. In the foregoing case, a loop is formed in such a manner that the number of next sets of recording sheets is stored in step S129 and then the operation proceeds to step S131 shown in FIG. 20.

In step S132 the receiving bin is set to Sb(1), the number of sets of recording sheets required by the external unit is set to m, and the number of surplus sets is set to f1. In step S133 the number f1 of surplus sets is set to "0" (f1=0). Then, 1 (appointed bin) and n (the bin number) are increased (n=n+1, 1=1+1 in steps S134 and S135). In step S136 information of each bin determined in the bin empty state determining routine is read. If the bin of present interest is not empty, the operation returns to step S135. If the bin of present interest is empty, the operation proceeds to step S137 so that the bin number=1 is stored in the appointed bin Sb(1).

If the number (1) of the appointed bins and the number (m) of sets of recording sheets coincide with each other in step S138, whether standby for output exists is determined in step S139. If standby for the output exists, the number m of the next output is stored in step S140 and the operation returns to step S131. If no standby exists, this routine is ended.

If 1<m in step S138, the bin numbers, to each of which a reference has been made, and the number of all bins are subjected to a comparison in step S141. If the bin numbers are smaller than the number of all bins, the operation returns to step S134 and the same flow is repeated. If all bins have been determined, the number f1 of surplus sets is set to m−1 in step S142 and this routine is ended.

Another embodiment of the present invention will now be described. The structure of this embodiment is the same as that shown in FIGS. 1 and 2.

Figure 21:
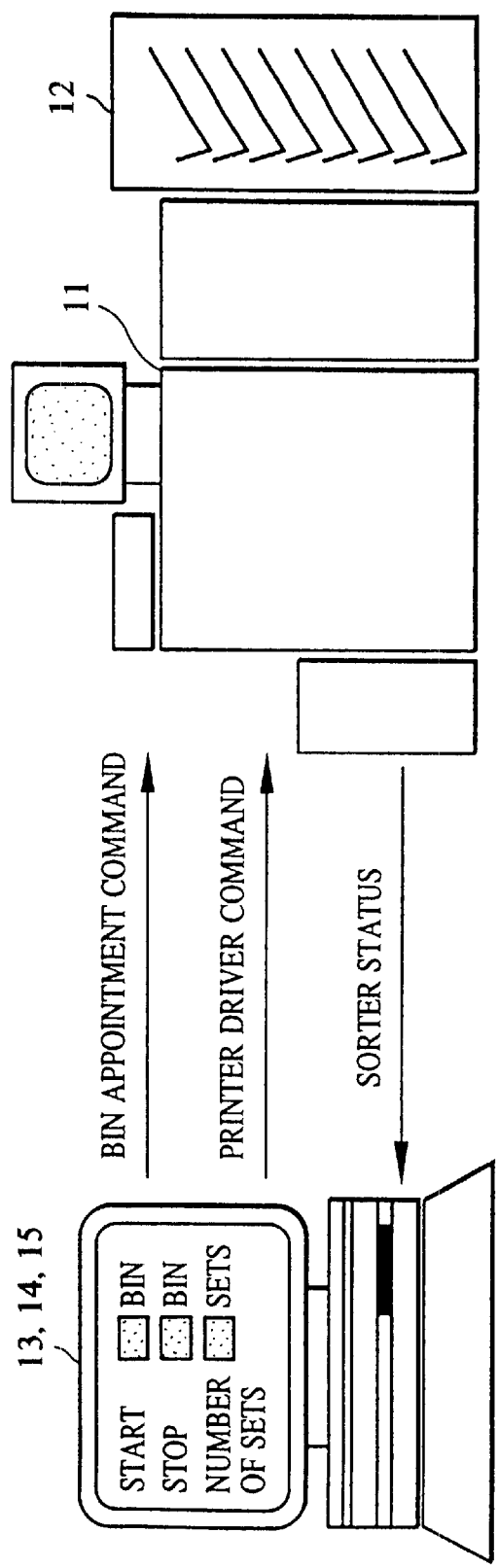
FIG. 21 is a schematic view showing transmission and receipt of signals between computers 13, 14 and 15 each having driver software and the body of a copying machine 12.

In this embodiment, each of the computers 13, 14 and 15 contains printer driver software capable of controlling the mail box sorter 11. As shown in FIG. 21, the printer driver software appoints a start bin, a stop bin and the number of sets to be printed (the number of sets to be discharged). Moreover, the printer driver software has a function for displaying information of each signal transmitted from the body of the copying machine 12 on a display apparatus, such as a monitor.

In a case where an image read by the scanner 16, the facsimile apparatus 17 or the copying machine 12 by using the computer 13 or a sentence processed by the computer 13 is printed by the printer of the copying machine 12 and sorted by the mail box sorter 11 into bins, the printer driver software in the computer 13 starts operating and thus a command for appointing bins (the command for appointing receptacles) is transmitted to the copying machine 12.

When the copying machine 12 receives the bin appointment command, the empty bin numbers and the number of empty bins within the appointed range of bins are, as sorter status signal, transmitted to the computer 13.

If the received number of empty bins is larger than the inputted number of sets to be printed, the driver software permits printing in such a manner that the received information and the bin appointment command are included in the printer driver command and transmitted to the copying machine 12. The copying machine 12 receives the printer driver command and starts printing in accordance with a printing queue processed by the printer driver command. Thus, the recording sheets are sorted.

If the number of empty bins is smaller than the number of sets to be printed, the driver software causes the display unit to display an alarm or an inhibition. According to circumstances, display of selection of sorting in the offset sorting operation is also displayed. The offset sorting is a method of shifting the positions of a plurality of printed sets of sheets in one bin.

Figure 22:
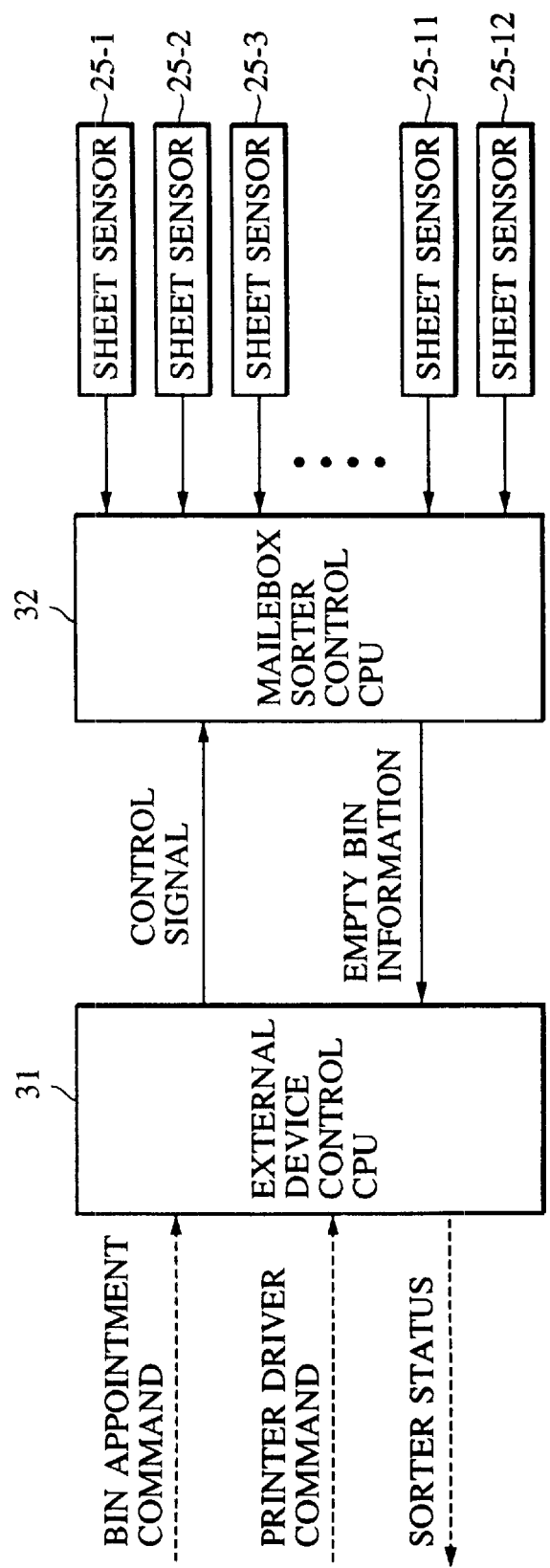
FIG. 22 is a schematic view showing the relationship between the CPU in the copying machine 12 and the CPU in the mail box sorter 11.

FIG. 22 is a schematic view showing the relationship between the CPU in the copying machine 12 and the CPU in the mail box sorter 11.

Referring to FIG. 22, reference numeral 31 represents an external-unit controlling CPU disposed in the body of the copying machine 12, and 32 represents a sorter controlling CPU disposed in the mail box sorter 11.

The external-unit controlling CPU 31 controls a printing standby state, a state of use of the network 10, a state of bins which are being used, the count of recording sheets, a state of recording sheets (whether a single sheet or a bundle of sheets) and the count of the sheet sets. Moreover, the external-unit controlling CPU 31 receives a command for appointing receptacles and the printer driver command transmitted by an external unit connected to the network 10 so as to transmit a control signal to the sorter controlling CPU 32.

The sorter controlling CPU 32 is a CPU for controlling the communication between the body of the copying machine 12 and the mail box sorter 11. The sorter controlling CPU 32 detects a state where a sheet exists in each of receptacles 23-1 to 23-12 and transmits empty bin information to the external-unit controlling CPU 31. Moreover, the sorter controlling CPU 32 counts the total number of the recording sheets received by the receptacles 23-1 to 23-12. Moreover, the sorter controlling CPU 32 responds to the command for appointing receptacles issued by the external-unit controlling CPU 31 so as to perform control for maximizing the productivity in the sorting operation.

The operation of this embodiment will now be described.

When the external-unit controlling CPU 31 receives the bin appointment command, information of the command is converted into a control signal and the control signal is transmitted to the external-unit controlling CPU 31. When the sorter controlling CPU 32 receives the control signal, information from each of the sheet sensors 25-1 to 25-12 in each bin is fetched and empty bin information is transmitted to the external-unit controlling CPU 31.

The external-unit controlling CPU 31 converts the empty bin information into a sorter status signal and transmits the signal to the computer 13, 14 or 15. When the computer 13, 14 or 15 receives the sorter status signal and the driver software confirms the information indicated by the sorter status signal, the driver software displays the information on the display unit, permission of printing, alarm, inhibition and selection of the offset sorting mode.

When a user confirms the display, performs an input with respect to the display or selects the offset sorting mode, the driver software converts information about the operation performed by the user into a bin appointment command to be included in a printer driver command together with the sorter status information. Then, the driver software transmits the printer driver command to the external-unit controlling CPU 31 in the body of the copying machine 12.

When the external-unit controlling CPU 31 receives the printer driver command, the external-unit controlling CPU 31 makes a print queue for performing printing and sorting of recording sheets and transmits a novel control signal to the sorter controlling CPU 32.

Figure 23:
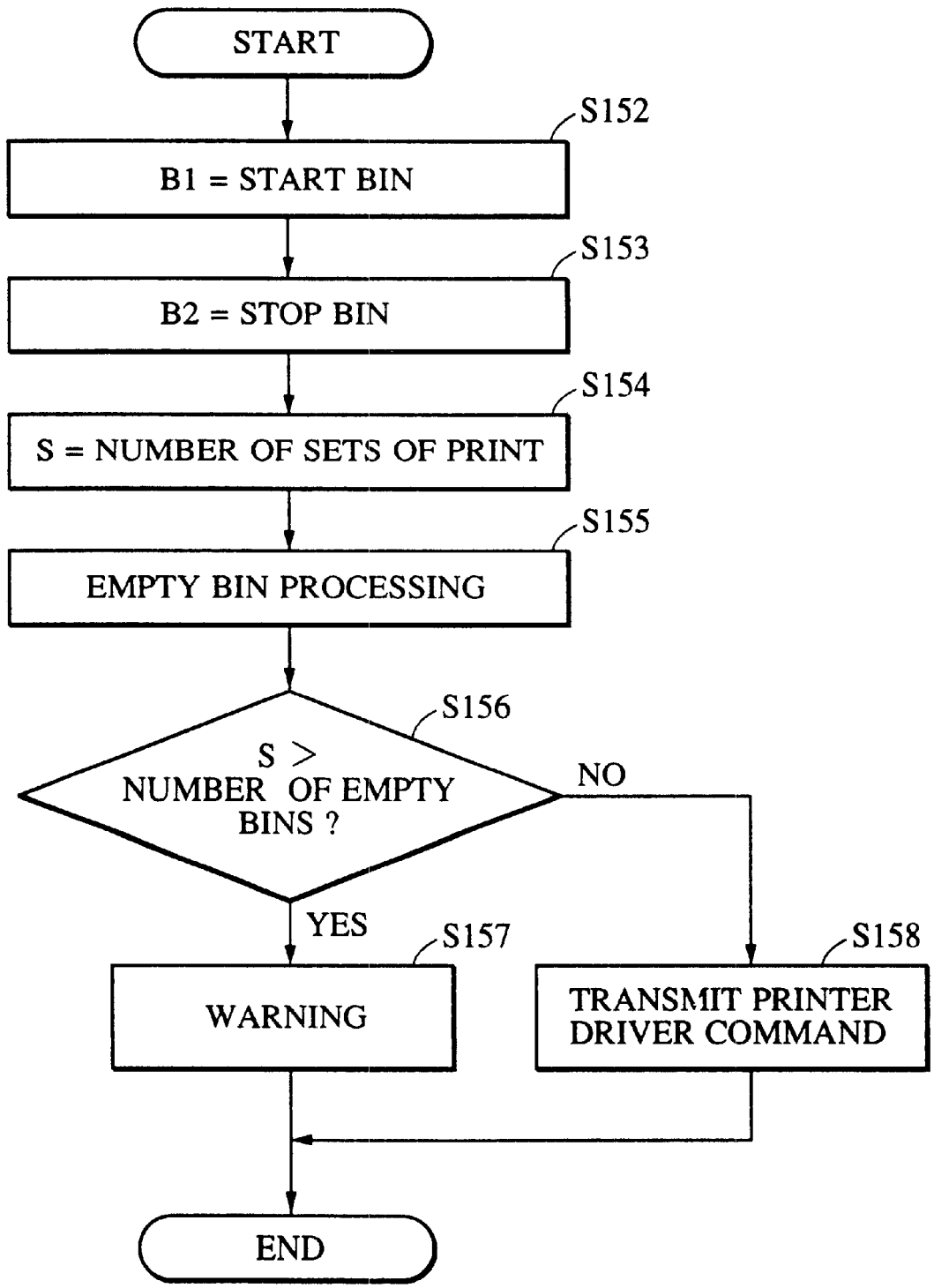
FIG. 23 is a flow chart of a process to be performed by driver software according to another embodiment of the present invention.

FIG. 23 is a flow chart of a process to be performed by the driver software according to this embodiment.

In this routine, when the program is started, the bins for receiving the recording sheets are appointed by causing, in steps S152 to S154, the computer 13, 14 or 15 to input start bin B1, stop bin B2 and the number S of sets to be printed. Then, the driver software performs the empty bin process in step S155 and receives, from the copying machine 12, information about the bin numbers and the number of bins disposed between the start bin B1 and the stop bin B2 appointed in the empty bin process.

Then, the operation proceeds to step S156 so that the driver software determines whether the number of empty bins, which is the content of the received empty bin information, is smaller than the number S of sets to be printed. If the number of empty bins is larger than the number S of sets to be printed, the driver software transmits a printer driver command in step S158 to perform printing and sorting of recording sheets. Then, the copying machine 12 transmits a printing end signal to the computer 13, 14 or 15, and the operation of the driver software is ended.

If the number of empty bins is, in step S156, smaller than the number S of sets to be printed, an alarm is issued to the display unit in step S157. In the foregoing case, the process for inhibiting the setting operation may be performed in place of performing the process for issuing the alarm.

Another embodiment of the present invention will now be described.

Figure 24:
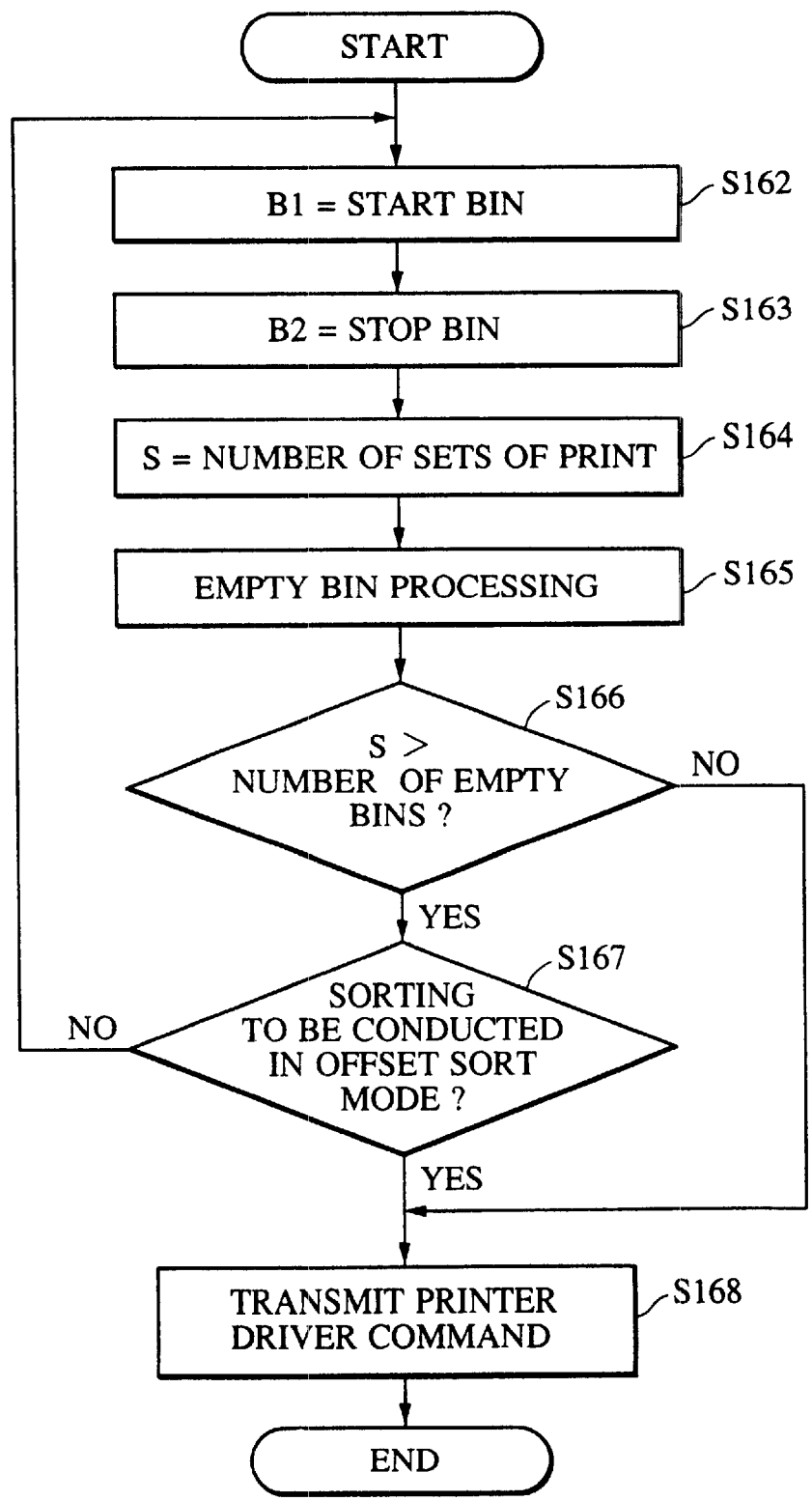
FIG. 24 is a flow chart of a process to be performed by driver software according to another embodiment of the present invention.

This embodiment has a structure such that the foregoing information processing system having the flow of the process shown in FIG. 23 and to be performed by the driver software shown in FIG. 23 is replaced by the flow of the process shown in FIG. 24.

In steps S162 to S166 the same process as that of the foregoing embodiment from step S152 to S156 is performed. If the number of empty bins is determined in step S166 to be smaller than the number S of sets to be printed, the selection of sorting can be performed by offset sorting in step S167.

In a case where the sorting is performed by offset sorting, or in a case where the number of empty bins is larger than the number of sets of sheets to be printed, the printer driver command is transmitted (step S168) so that printed sheets and recording sheets are sorted.

In a case where sorting by means of the offset sorting is not performed, the operation returns to input of the start bin in step S162 and the sorting bins are again set.

This embodiment may be combined with the foregoing embodiment such that the alarm is issued prior to performing selection of sorting by the offset sorting in step S167.

Another embodiment of the present invention will now be described.

Figure 25:
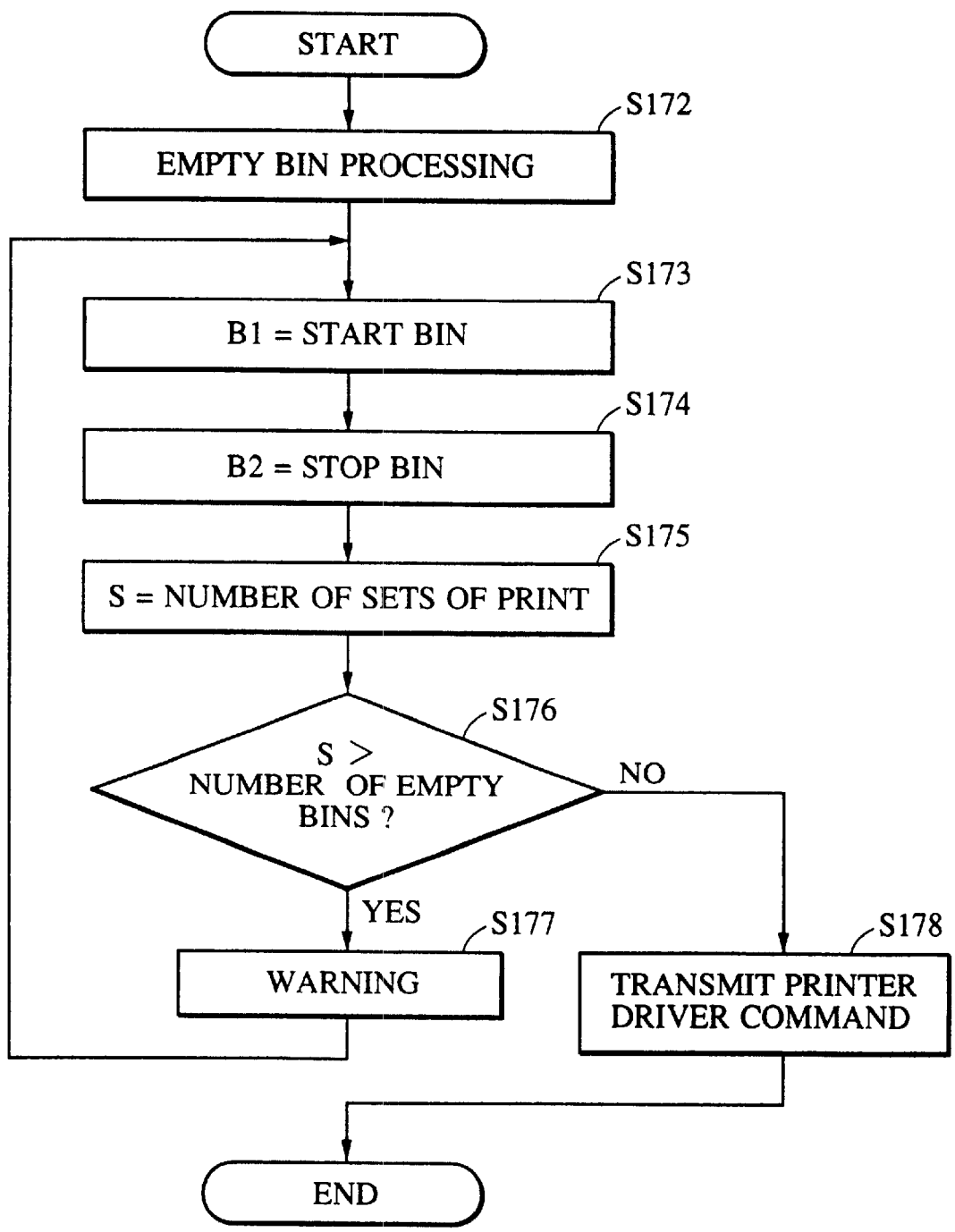
FIG. 25 is a flow chart of a process to be performed by driver software according to another embodiment of the present invention.

This embodiment has the structure such that the information processing system according to the foregoing embodiment has an arrangement that the flow of the process to be performed by the driver software shown in FIG. 23 is replaced by that shown in FIG. 25.

The driver software according to this embodiment performs the empty bin process in step S172 so that information of all bins in the mail box sorter 11 is received from the copying machine 12 so that the driver software acquires information about empty bins. In steps S173 to step S175 the computer 13, 14 or 15 is used to input the start bin B1, the stop bin B2 and the number S of sets of sheets to be printed. Then, the operation proceeds to step S176 so that the number of sets of sheets to be printed and the number of empty bins are subjected to a comparison. If the number of empty bins is larger than the number S of sets of sheets to be printed, the printer driver command is transmitted in step S178 so that printing and sorting of recording sheets are performed.

If the number of empty bins is, in step S176, smaller than the number S of sets of sheets to be printed, an alarm is issued to the display unit in step S177. Then, the operation returns to step S173 so that setting of sorting bins is performed again.

This embodiment may be combined with the foregoing embodiment such that the comparison of the number of sets of sheets, to be printed, and the number of empty bins is performed or an alarm is issued, and then selection of sorting by the offset sorting can be performed.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An information processing apparatus comprising:

image forming means, which visualizes an image input from an external unit, connected to a network, on recording sheets;

receptacle-appointment-command receiving means for receiving a receptacle-appointment-command issued by the external unit;

a plurality of receptacles for receiving the recording sheets outputted from said image forming means;

sorting means for sorting the plurality of recording sheets into said plurality of receptacles in accordance with the receptacle-appointment-command;

sheet detection means provided for each of said plurality of receptacles so as to detect the presence of a recording sheet in each of said plurality of receptacles;

usable receptacle determining means for determining usable receptacles from said plurality of receptacles in accordance with a result of detection performed by said sheet detection means;

information transmissions means for transmitting data for notifying said usable receptacles determined by said usable receptacle determining means through the network to the external unit; and selection control means for selecting a receptacle from usable receptacles in accordance with information from said sheet detection means, if there is no appointment by the receptacle-appointment-command when inputting an image from the external unit, wherein said sorting means sorts the recording sheets into said receptacle selected by said selection control means.

2. An information processing apparatus according to claim 1, further comprising:

control means for sorting by shifting a position at which the recording sheets are received in a same receptacle, when a number of said plurality of receptacles appointed in accordance with the receptacle-appointment-command or a number of sets of sheets to be sorted is larger than a number of usable receptacles.

3. An information processing apparatus according to claim 1, further comprising:

display means for displaying a user corresponding to each of said plurality of receptacles.

4. An information processing apparatus according to claim 1, wherein said usable receptacle determining means determines usable receptacles in accordance with a state of use of each of said plurality of receptacles determined by a result of a detection performed by said sheet detection means.

5. An information processing apparatus according to claim 4, further comprising:

setting means for automatically setting receptacles for sorting by controlling a position at which the recording sheets are received and receptacles for not sorting.

6. An information processing method of performing image forming processing for visualizing an image input from an external unit, connected to a network, on recording sheets, and sorting processing for sorting the recording sheets into a plurality of receptacles in accordance with the receptacle-appointment-command issued by the external unit, said method comprising the steps of:

performing usable receptacle determining processing for determining usable receptacles from the plurality of receptacles in accordance with information regarding the presence of recording sheets in each of the plurality of receptacles;

performing information transmission processing for transmitting data for notifying the usable receptacles determined by said usable receptacle determining processing step through the network to the external unit; and performing selection control processing for selecting a receptacle from the plurality of receptacles in accordance with information regarding the presence of recording sheets in each of the receptacles, if there is no appointment by the receptacle-appointment-command when inputting an image from the external unit, wherein said sorting and receiving processing sorts the recording sheets into the receptacle selected by said selection control processing step.

7. An information processing method according to claim 6, further comprising the step of:

performing sorting processing for sorting by shifting a position at which the recording sheets are received in a same receptacle, when a number of the receptacles appointed in accordance with the receptacle-appointment-command or a number of sets of sheets to be sorted is larger than a number of the usable receptacles.

8. An information processing method according to claim 6, further comprising the step of:

performing displaying processing for displaying a user corresponding to each of the plurality of receptacles.

9. An information processing method according to claim 6, wherein said usable receptacle determining processing step determines the usable receptacles in accordance with a state of use of each of the plurality of receptacles determined by information regarding the presence of recording sheets in each of the plurality of receptacles.

10. An information processing method according to claim 9, further comprising the step of:

performing setting processing for automatically setting the plurality of receptacles for setting by controlling a position at which the recording received in accordance with a result of determination by said usable receptacle determining step.

11. An information processing apparatus including:

image forming means for visualizing an image input from an external unit, connected by a network, on sheets and forming recording sheets;

receptacle appointment command receiving means for receiving a receptacle-appointment-command issued by said external unit;

a plurality of receptacles for receiving the recording sheets output from said image forming means;

sorting and receiving means for sorting and receiving the recording sheets into said plurality of receptacles in accordance with the receptacle-appointment-command;

sheet detection means each provided for each of said plurality of receptacles so as to detect the presence of a recording sheet in each said receptacle;

selection control means for selecting a receptacle from said plurality of receptacles in accordance with information from said detection means, when the receptacle-appointment-command receiving means does not receive the receptacle-appointment-command when an image is input from said external unit; and priority order determining means for determining a priority order of usable receptacles including said receptacle selected by said selection control means with respect to said external unit in accordance with a state of use of the apparatus, wherein said sorting and receiving means sorts the recording sheets into said usable receptacles in the priority order determined by said priority order determining means.

12. An information processing apparatus according to claim 11, wherein said receptacle selected by said selection control means is set so as to have a highest priority among said usable receptacles.

13. An information processing apparatus according to claim 11, wherein, in order to display information of said usable receptacles of the external unit, the information of said usable receptacles is transmitted through the network.

14. An information processing method of performing image forming processing for visualizing an image input from an external unit, connected to a network, on sheets and forming recording sheets, and sorting and receiving processing for sorting the recording sheets after said image forming processing is performed into a plurality of receptacles in accordance with receptacle-appointment-command issued by the external unit, said method comprising the steps of:

performing selection control processing for selecting a receptacle from the plurality of receptacles in accordance with information regarding the presence of recording sheets in each of the plurality of receptacles, when the receptacle-appointment-command is not received when inputting an image from the external unit; and performing priority order determining processing for determining a priority order of usable receptacles including the receptacle selected by said selection control processing step with respect to the external unit in accordance with a state of use of the apparatus, before the sorting and receiving processing step is performed, wherein the sorting and receiving processing step sorts the recording sheets into usable receptacles in the priority order determined by said priority order determining processing step.

15. An information processing method according to claim 14, wherein the receptacle selected by said selection control processing step is set so as to have a highest priority among the usable receptacles.

16. An information processing method according to claim 14, wherein in order to display information of the usable receptacles on the external unit, the information of each of the usable receptacles is transmitted to the external unit through the network.

17. An information processing apparatus including:

image forming means for visualizing an image input from an external unit, connected to a network, on sheets and forming recording sheets;

receptacle-appointment-command receiving means for receiving a receptacle-appointment-command issued by the external unit;

a plurality of receptacles for receiving the recording sheets output from said image forming means;

sorting and receiving means for sorting and receiving the recording sheets into said plurality of receptacles in accordance with the receptacle-appointment-command;

sheet detection means each provided for each of said plurality of receptacles so as to detect the presence of a recording sheet in each of said plurality of receptacles:

selection control means for selecting a receptacle from said plurality of receptacles in accordance with information from said sheet detection means, if said receptacle-appointment-command receiving means does not receive the receptacle-appointment-command when inputting an image from the external unit, wherein said sorting and receiving means sorts the recording sheets into said receptacle selected by said selection control means, if the receptacle-appointment-command receiving means does not receive the receptacle-appointment-command.

18. An information processing apparatus according to claim 17, further comprising a display, wherein a display is displayed indicating that said receptacle selected by said selection control means is not the receptacle appointed by the receptacle-appointment-command.

19. An information processing method of performing image forming processing for visualizing an image input from an external unit, connected to a network, and forming recording sheets, and sorting and receiving processing for sorting the recording sheets after said image forming processing is performed, into a plurality of receptacles in accordance with a receptacle-appointment-command issued by the external unit, said method comprising the step of:

performing selection control processing for selecting a receptacle from the plurality of receptacles in accordance with information regarding the presence of recording sheets in each of the plurality of receptacles, if the receptacle-appointment-command is not received when inputting an image from the external unit before the sorting and receiving processing step is performed, wherein the sorting and receiving processing step sorts the recording sheets into the receptacle selected by said selection control processing step.

20. An information processing method according to claim 19, further comprising the step of:

a nonappointment receptacle displaying processing step for displaying an indication that the receptacle selected by said selection control processing is not the receptacle appointed by the receptacle-appointment-command is performed after said selection control processing step is performed.

21. An information processing apparatus comprising:

image forming means for visualizing an image input from an external unit, connected to a network, and forming an image on a recording sheet;

receptacle-appointment-command receiving means for receiving a receptacle-appointment-command issued by the external unit;

a plurality of receptacles for receiving the recording sheets output from said image forming means;

sorting means for sorting the recording sheets into said plurality of receptacles in accordance with the receptacle-appointment-command;

sheet detection means provided for each of said plurality of receptacles so as to detect the presence of a recording sheet in each of said plurality of receptacles; and selection control means for selecting a receptacle from said plurality of receptacles in accordance with information from said sheet detection means, if there is no appointment by the receptacle-appointment-command when inputting an image from the external unit, wherein said sorting means sorts the recording sheets into the receptacle selected by said selection control means.

22. An information processing method of performing image forming processing for visualizing an image input from an external unit, connected to a network, and forming an image on a recording sheet, and sorting the recording sheet after said image forming processing is performed, into a plurality of receptacles in accordance with a receptacle-appointment-command issued by the external unit, said method comprising the steps of:

determining if there is an appointment of a receptacle by the receptacle-appointment-command;

performing selection control processing for selecting a receptacle from the plurality of receptacles in accordance with information regarding the presence of recording sheets in each of the receptacles, if there is no appointment by the receptacle-appointment-command when inputting an image from the external unit, wherein said sorting processing sorts the recording sheets into the receptacle selected by said selection control processing.

23. An information processing apparatus comprising:

image forming means which visualizes an image input from an external unit, connected to a network, and forms an image on a recording sheet;

sorting means for sorting the recording sheet after said image forming means forms an image, into a plurality of receptacles in accordance with a receptacle-appointment-command issued by the external unit;

determining means for determining if there is an appointment of a receptacle by the receptacle-appointment-command;

selection control means for selecting a receptacle from the plurality of receptacles in accordance with information regarding the presence of recording sheets in each of the receptacles, if there is no appointment by the receptacle-appointment-command when inputting an image from the external unit, wherein said sorting means sorts the recording sheets into the receptacle selected by said selection control means.

24. An information apparatus according to claim 23, further comprising:

a nonappointment receptacle displaying means for displaying an indication that the receptacle selected by said selection control means is not the receptacle appointed by the receptacle-appointment-command.

* * * * *